(12) United States Patent
Arai et al.

(10) Patent No.: US 10,943,338 B2
(45) Date of Patent: Mar. 9, 2021

(54) EDGE-INDUCED VISUAL ILLUSION GENERATION APPARATUS, METHOD OF GENERATING EDGE-INDUCED VISUAL ILLUSION, EDGE-INDUCED VISUAL ILLUSION GENERATION PROGRAM, PRINTING MEDIUM, AND RECORDING MEDIUM

(71) Applicant: JAPAN SCIENCE AND TECHNOLOGY AGENCY, Saitama (JP)

(72) Inventors: Hitoshi Arai, Tokyo (JP); Shinobu Arai, Tokyo (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 43 days.

(21) Appl. No.: 16/277,194

(22) Filed: Feb. 15, 2019

(65) Prior Publication Data
US 2019/0180425 A1   Jun. 13, 2019

Related U.S. Application Data

(63) Continuation of application No. PCT/JP2017/029433, filed on Aug. 16, 2017.

(30) Foreign Application Priority Data

Aug. 16, 2016  (JP) .............................. JP2016-159771

(51) Int. Cl.
*G06T 5/20*  (2006.01)
*G06T 5/00*  (2006.01)
(Continued)

(52) U.S. Cl.
CPC ................ *G06T 5/20* (2013.01); *G06T 5/003* (2013.01); *G06T 5/007* (2013.01); *G06T 5/009* (2013.01);
(Continued)

(58) Field of Classification Search
CPC .. G06T 5/20; G06T 5/007; G06T 5/10; G06T 5/003; G06T 7/13; G06T 5/009;
(Continued)

(56) References Cited

U.S. PATENT DOCUMENTS

| | | | | |
|---|---|---|---|---|
| 5,760,843 | A * | 6/1998 | Morimura ................ | H04N 5/57 348/603 |
| 2009/0028426 | A1 * | 1/2009 | Maki ...................... | G03G 15/01 382/164 |
| 2015/0078676 | A1 * | 3/2015 | Arai ......................... | G06T 5/10 382/260 |

FOREIGN PATENT DOCUMENTS

| | | |
|---|---|---|
| JP | H07170428 A | 7/1995 |
| JP | 2009031978 A | 2/2009 |
| WO | WO2013/128781 A1 | 9/2013 |

OTHER PUBLICATIONS

Kitaoka, Akiyoshi, "Introduction to Visual Ilusion," Asakura Publishing Co., Ltd., 2010, 11 pages.
(Continued)

*Primary Examiner* — Amandeep Saini
(74) *Attorney, Agent, or Firm* — Muncy, Geissler, Olds & Lowe, P.C.

(57) ABSTRACT

Provided are an edge-induced visual illusion generation apparatus, a method, a program, and a recording medium capable of being applied to any image, automatically generating an edge-induced visual illusion without complicated work, and improving contrast using the edge-induced visual illusion. A two-dimensional digital filter, which is a filter with no orientation or an even filter with orientation and is (Continued)

a filter that allows a band of a relatively high frequency to pass or a high pass filter, or is an orientation-selective wavelet frame or an orientation-selective filter bank that are a set of an approximation filter with no orientation and detail filters with orientations, is applied to image data, and a component of a relatively high frequency band or a high frequency component is extracted, and/or coloring is applied to an edge of the extracted band component or the high frequency component, thereby generating an edge-induced visual illusion image.

11 Claims, 44 Drawing Sheets

(51) Int. Cl.
  *G06T 5/10* (2006.01)
  *G06T 7/13* (2017.01)
  *G06T 11/00* (2006.01)
(52) U.S. Cl.
  CPC .................. *G06T 5/10* (2013.01); *G06T 7/13* (2017.01); *G06T 11/001* (2013.01); *G06T 2207/20016* (2013.01); *G06T 2207/20064* (2013.01); *G06T 2207/20192* (2013.01)
(58) Field of Classification Search
  CPC ......... G06T 11/001; G06T 2207/20016; G06T 2207/20192; G06T 2207/20064
  USPC ........................................................ 382/260
  See application file for complete search history.

(56) References Cited

OTHER PUBLICATIONS

Takashima, Midori, "Achromatic watercolor effect: About requirement of formation of sumi painting effect," The Japanese Journal of sychology, 2008, vol. 79, No. 4, pp. 379-384.
Craik, Kenneth, "The Nature of Psychology," Cambridge at the University Press, 1966, 4 pages.
O'Brien, Vivian, "Contour Perception, Illusion and Reality," Journal of the Optical Society of America, vol. 48, No. 2, Feb. 1958, pp. 112-119.
Pinna et al., "Surface color from boundaries: a new "watercolor" illusion," Vision Research, vol. 41, (2001), pp. 2669-2676.
Pinna et al., "The watercolor effect: a new principle of grouping and figure-ground organization," vision Research, vol. 43 (2003), pp. 43-52.
Nezu, Eifu, "Efforts for image quality improvement of Projector," NEC Technical Journal, vol. 60, No. 3, (2007) pp. 94-97.
Arai et al., "2D tight framelets with orientation selectivity suggested by vision science," Japan Society for Industrial and Applied Mathematics, vol. 1 (2009) pp. 9-12.
Arai et al., "Finite Discrete, Shift-Invariant, Directional Filterbanks for Visual Informtion Processing, I : Contruction," Interdisciplinary Information Sciences, vol. 13, No. 2, pp. 2550273 (2007).
Office Action dated Jul. 7, 2020 in JP Application No. 2018-534410.
Office Action of JP Application No. 2018-534410 and English translation, dated Sep. 23, 2020, 5 pages.

\* cited by examiner

FIG.5

| $d_k(1)$ | $d_k(2)$ | $d_k(3)$ | $d_k(4)$ | $d_k(5)$ | $d_k(6)$ | $d_k(7)$ | $a_k(1)$ | | | | | | |
|---|---|---|---|---|---|---|---|---|---|---|---|---|---|
| $d_k(8)$ | $d_k(9)$ | $d_k(10)$ | $d_k(11)$ | $d_k(12)$ | $d_k(13)$ | $d_k(14)$ | $d_k(15)$ | | | | | | |
| $d_k(16)$ | $d_k(17)$ | $d_k(18)$ | $d_k(19)$ | $d_k(20)$ | $d_k(21)$ | $d_k(22)$ | $d_k(23)$ | | | | | | |
| $d_k(24)$ | $d_k(25)$ | $d_k(26)$ | $d_k(27)$ | $d_k(28)$ | $d_k(29)$ | $d_k(30)$ | $d_k(31)$ | | | | | | |
| $d_k(32)$ | $d_k(33)$ | $d_k(34)$ | $d_k(35)$ | $d_k(36)$ | $d_k(37)$ | $d_k(38)$ | $d_k(39)$ | | | | | | |
| $d_k(40)$ | $d_k(41)$ | $d_k(42)$ | $d_k(43)$ | $d_k(44)$ | $d_k(45)$ | $d_k(46)$ | $d_k(47)$ | | | | | | |
| $d_k(48)$ | $d_k(49)$ | $d_k(50)$ | $d_k(51)$ | $d_k(52)$ | $d_k(53)$ | $d_k(54)$ | $d_k(55)$ | | | | | | |
| $d_k(56)$ | $d_k(57)$ | $d_k(58)$ | $d_k(59)$ | $d_k(60)$ | $d_k(61)$ | $d_k(62)$ | $d_k(63)$ | | | | | | |
| | | | | | | | | $d_k(64)$ | $d_k(65)$ | $d_k(66)$ | $d_k(67)$ | $d_k(68)$ | $d_k(69)$ |
| | | | | | | | | $d_k(70)$ | $d_k(71)$ | $d_k(72)$ | $d_k(73)$ | $d_k(74)$ | $d_k(75)$ |
| | | | | | | | | $d_k(76)$ | $d_k(77)$ | $d_k(78)$ | $d_k(79)$ | $d_k(80)$ | $d_k(81)$ |
| | | | | | | | | $d_k(82)$ | $d_k(83)$ | $d_k(84)$ | $d_k(85)$ | $d_k(86)$ | $d_k(87)$ |
| | | | | | | | | $d_k(88)$ | $d_k(89)$ | $d_k(90)$ | $d_k(91)$ | $d_k(92)$ | $d_k(93)$ |
| | | | | | | | | $d_k(94)$ | $d_k(95)$ | $d_k(96)$ | $d_k(97)$ | $d_k(98)$ | $d_k(99)$ |

FIG.9

| | | | | | | | | LEVEL 2 | | | | | |
|---|---|---|---|---|---|---|---|---|---|---|---|---|---|
| 0 | 0 | 0 | 0 | 0 | 0 | 1 | 0 | | | | | | |
| 0 | 0 | 0 | 0 | 0 | 0 | 1 | 1 | 1 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | | | | | | |

FIG.13

LEVEL 1

| 1 | 1 | 1 | 1 | 1 | 1 | 1 | 0 |   |   |   |   |   |   |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 |   |   |   |   |   |   |

FIG.14

LEVEL 2

| 1 | 1 | 1 | 1 | 1 | 1 | 1 | 0 |   |   |   |   |   |   |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 |   |   |   |   |   |   |

FIG.15

LEVEL 3

| 1 | 1 | 1 | 1 | 1 | 1 | 0.7 | 0   |     |   |   |   |   |   |
|---|---|---|---|---|---|-----|-----|-----|---|---|---|---|---|
| 1 | 1 | 1 | 1 | 1 | 1 | 0.7 | 0.7 | 0.7 | 1 | 1 | 1 | 1 | 1 |
| 1 | 1 | 1 | 1 | 1 | 1 | 1   | 1   | 1   | 1 | 1 | 1 | 1 | 1 |
| 1 | 1 | 1 | 1 | 1 | 1 | 1   | 1   | 1   | 1 | 1 | 1 | 1 | 1 |
| 1 | 1 | 1 | 1 | 1 | 1 | 1   | 1   | 1   | 1 | 1 | 1 | 1 | 1 |
| 1 | 1 | 1 | 1 | 1 | 1 | 1   | 1   | 1   | 1 | 1 | 1 | 1 | 1 |
| 1 | 1 | 1 | 1 | 1 | 1 | 1   | 1   | 1   | 1 | 1 | 1 | 1 | 1 |
| 1 | 1 | 1 | 1 | 1 | 1 | 1   | 1   |     |   |   |   |   |   |

FIG.21

| | | | LEVEL 1 | | | | | | | | | | |
|---|---|---|---|---|---|---|---|---|---|---|---|---|---|
| 0 | 0 | 0 | 0 | 0 | 0 | 1 | 0 | | | | | | |
| 0 | 0 | 0 | 0 | 0 | 0 | 1 | 1 | 1 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | | | | | | |

FIG.24

LEVEL 2

| 0 | 0 | 0 | 0 | 0 | 0 | 1 | 0 |   |   |   |   |   |   |
|---|---|---|---|---|---|---|---|---|---|---|---|---|---|
| 0 | 0 | 0 | 0 | 0 | 0 | 1 | 1 | 1 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 |   |   |   |   |   |   |

FIG.28

LEVEL 2

| 0 | 0 | 0 | 0 | 0 | 0 | 1 | 0 |   |   |   |   |   |   |
|---|---|---|---|---|---|---|---|---|---|---|---|---|---|
| 0 | 0 | 0 | 0 | 0 | 0 | 1 | 1 | 1 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 |   |   |   |   |   |   |

FIG.30

LEVEL 1

| 1 | 1 | 1 | 0 |   |   |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |

FIG.31

LEVEL 2

| 1 | 1 | 1 | 0 |   |   |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |

FIG.35

LEVEL 1

| 1 | 1 | 1 | 0 |   |   |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |

FIG.37

LEVEL 1

| 0 | 0 | 0 | 0 | 0 | 0 | 1 | 0 |   |   |   |   |   |   |
|---|---|---|---|---|---|---|---|---|---|---|---|---|---|
| 0 | 0 | 0 | 0 | 0 | 0 | 1 | 1 | 1 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 |   |   |   |   |   |   |

FIG.40

LEVEL 2

| 0 | 0 | 0 | 0 | 0 | 0 | 1 | 0 |   |   |   |   |   |   |
|---|---|---|---|---|---|---|---|---|---|---|---|---|---|
| 0 | 0 | 0 | 0 | 0 | 0 | 1 | 1 | 1 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 |   |   |   |   |   |   |

EDGE-INDUCED VISUAL ILLUSION GENERATION APPARATUS, METHOD OF GENERATING EDGE-INDUCED VISUAL ILLUSION, EDGE-INDUCED VISUAL ILLUSION GENERATION PROGRAM, PRINTING MEDIUM, AND RECORDING MEDIUM

BACKGROUND OF THE INVENTION

1. Field of the Invention

The present invention relates to an edge-induced visual illusion generation apparatus, a method of generating an edge-induced visual illusion, an edge-induced visual illusion generation program, a printing medium, and a recording medium.

2. Description of the Related Art

Conventionally, a visual illusion in which brightness and color of an area having an edge appear to differ from actual brightness has been known.

For example, the Craik-O'Brien-Cornsweet effect has been conventionally known. In this visual illusion, an edge in which a portion with steep gradation change is in a gradual change is provided at the boundary of areas having the same brightness in reality, whereby the brightness of the areas on both sides of the edge appear to look different. The chart below is an image diagram illustrating a change in brightness of the Craik-O'Brien-Cornsweet effect. The solid line represents the actual brightness, and the broken line represents the perceived brightness. In this manner, according to the Craik-O'Brien-Cornsweet effect, in a case where, in two adjacent areas having the same brightness separated by an edge, the brightness from one area to a steep part in the edge has a smooth dark change and the other has a smooth bright change, the effect of causing a visual illusion in which the brightness of the two areas appear to look different is exerted.

Besides, a sumi painting effect has been conventionally known (see Non-patent literature 2, etc.). In this sumi painting effect, two lines of different uniform gradations are adjoined at the boundary of areas having the same brightness in reality to form an edge that steeply changes, whereby the brightness of the areas on both sides of the edge appear to look different. The chart below is an image diagram illustrating a change in brightness of the sumi painting effect. When two rectangular waveform lines having different brightness form an edge, a visual illusion in which respective areas surrounded by the edges appear to have different brightness despite the same brightness occurs.

As for color, a watercolor illusion has been conventionally known (see Non-patent literatures 6 and 7, etc.). The watercolor illusion is a visual illusion in which a color of an area surrounded by a line appears to look different from reality, and an area surrounded by adjacent bright-colored line and dark-colored line appears to look thinly colored with the color of the inner line. Here, it is known that the visual illusion is higher when the shape of the line is wavy rather than the case of a straight line, and the visual illusion effect is high when the bright color is inside and the ground color is white. It has also been known that the visual illusion occurs in the case of a dotted line (Non-patent literature 6).

As described above, there have been found several visual illusions in which brightness and color of an area having an edge appear to look different from reality (hereinafter referred to as "edge-induced visual illusion") (see Non-patent literatures 1 to 7, etc.).

Non-patent literature 1: Akiyoshi Kitaoka, "Introduction to visual illusion", Asakura Publishing Co., Ltd., 2010.

Non-patent literature 2: Midori Takashima, "Achromatic watercolor effect: About requirement of formation of sumi painting effect", Psychological Research, 79, 379-384.

Non-patent literature 3: Craik, K. J. W., "The Nature of Psychology: A Selection of Papers, Essays and Other Writings", Cambridge Univ. Press, 1966.

Non-patent literature 4: O'Brien, V., "Contour perception, illusion and reality", Journal of the Optical Society of America, 48 (1958), 112-119.

Non-patent literature 5: Cornsweet, T., "Visual Perception", Academic Press, 1970.

Non-patent literature 6: Pinna, B., Brelstaff, G., Spillmann, L., "Surface color from boundaries" Vision Research 41 (2001), 2669-2676.

Non-patent literature 7: Pinna, B., Werner, J. S., Spillmann, L., "The watercolor effect: a new principle of grouping and figure-ground organization", Vision Research 43 (2003) 43-52.

Non-patent literature 8: Eifu Nezu, "Efforts for image quality improvement of projector", NEC Technical Journal, Vol. 60, No. 3 (2007), 94-97.

Non-patent literature 9: Hitoshi Arai et al., "2D tight framelets with orientation selectivity suggested by vision science", JSIAM Letters Vol. 1, 9-12, 2009.

Non-patent literature 10: Hitoshi Arai and Shinobu Arai, "Finite Discrete, Shift-Invariant, Directional Filterbanks for Visual Information Processing, I: Construction", Interdisciplinary Information Sciences, Vol. 13, No. 2 (2007), 255-273.

SUMMARY OF THE INVENTION

However, there has been a problem that, although a conventional method of generating the edge-induced visual illusion can be applied to a simple figure, it is difficult to apply the method to a complex figure.

For example, with respect to the Craik-O'Brien-Cornsweet effect and the sumi painting effect, conventionally, an edge is manually generated for each image using drawing software and the like to generate an image having the effect, which may raise a problem that time and effort are required and design is restricted. Further, according to the Craik-O'Brien-Cornsweet visual illusion, a change in brightness of an edge is smooth except for a saltus point, which may cause a problem that it is difficult to perform, on a complex figure, drawing with a visual illusion effect added thereto. Furthermore, according to the watercolor illusion, two adjacent wavy lines or the like need to be drawn along an outline of a figure, which may cause a problem that technical skill is required (see Non-patent literature 1).

The present invention has been conceived in view of the problems described above, and an object of the present invention is to provide an edge-induced visual illusion generation apparatus, a method of generating an edge-induced visual illusion, an edge-induced visual illusion generation program, a recording medium, and a printing medium capable of being applied to any image and automatically generating an edge-induced visual illusion having edges of various shapes without complicated work.

In order to achieve such an object, the edge-induced visual illusion generation apparatus according to the present invention includes at least a storage and a controller, in which the storage includes: a filter storage structured to store a two-dimensional digital filter that is a filter with no orientation or an even filter with orientation and is a filter that allows a band of a relatively high frequency to pass or a high pass filter, or is a wavelet frame with orientation selectivity or a filter bank with orientation selectivity that are a set of an approximation filter with no orientation and a plurality of detail filters with respective orientations; and an image data storage that stores image data, and the controller generates an edge-induced visual illusion image by applying the two-dimensional digital filter to the image data to extract a component of a relatively high frequency band or a high frequency component, and/or by applying coloring to an edge of the extracted band component or the high frequency component.

Moreover, according to the edge-induced visual illusion generation apparatus of the present invention, in the edge-induced visual illusion generation apparatus described above, the controller performs multiresolution decomposition on the image data using the two-dimensional digital filter.

Moreover, according to the edge-induced visual illusion generation apparatus of the present invention, in the edge-induced visual illusion generation apparatus described above, the filter storage stores a unit impulse response in which the two-dimensional digital filter is applied in advance to a unit impulse signal of an image size same as a size of the image data.

Moreover, according to the edge-induced visual illusion generation apparatus of the present invention, in the edge-induced visual illusion generation apparatus described above, the filter storage stores a pinwheel wavelet frame or a broad-sense pinwheel framelet having a degree that are a set of an approximation filter with no orientation and a plurality of detail filters with respective orientations.

Moreover, according to the edge-induced visual illusion generation apparatus of the present invention, in the edge-induced visual illusion generation apparatus described above, the controller generates the edge-induced visual illusion image by relatively attenuating a subband signal corresponding to the approximation filter and the detail filter of a high degree and relatively amplifying a subband signal corresponding to the detail filter of a low degree.

Moreover, according to the edge-induced visual illusion generation apparatus of the present invention, in the edge-induced visual illusion generation apparatus described above, the controller generates the edge-induced visual illusion image by relatively attenuating a subband signal corresponding to the approximation filter and the detail filter of a low degree and relatively amplifying a subband signal corresponding to the detail filter of a high degree.

Moreover, according to the edge-induced visual illusion generation apparatus of the present invention, in the edge-induced visual illusion generation apparatus described above, the controller generates the edge-induced visual illusion image by replacing an edge including the component of a relatively high frequency band or the high frequency component with a uniform value for each edge.

Moreover, according to the edge-induced visual illusion generation apparatus of the present invention, in the edge-induced visual illusion generation apparatus described above, the controller applies coloring to the edge of the extracted band component or the high frequency component, and sets a color of a ground other than the edge to a predetermined color.

Moreover, according to the edge-induced visual illusion generation apparatus of the present invention, in the edge-induced visual illusion generation apparatus described above, the edge-induced visual illusion image is generated for the purpose of improving contrast.

Moreover, according to the edge-induced visual illusion generation apparatus of the present invention, in the edge-induced visual illusion generation apparatus described above, the controller appropriately scales gradation of the generated edge-induced visual illusion image, and then superimposes the edge-induced visual illusion image to the original image data for the purpose of improving contrast.

Moreover, a method of generating an edge-induced visual illusion according to the present invention is a method to be executed in a computer including at least a storage and a controller, in which the storage includes: a filter storage structured to store a two-dimensional digital filter that is a filter with no orientation or an even filter with orientation and is a filter that allows a band of a relatively high frequency to pass or a high pass filter, or is a wavelet frame with orientation selectivity or a filter bank with orientation selectivity that are a set of an approximation filter with no orientation and a plurality of detail filters with respective orientations; and an image data storage that stores image data, and the controller executes generation of an edge-induced visual illusion image by applying the two-dimensional digital filter to the image data to extract a component of a relatively high frequency band or a high frequency component, and/or by applying coloring to an edge of the extracted band component or the high frequency component.

Moreover, an edge-induced visual illusion generation program according to the present invention is a program to be executed in a computer including at least a storage and a controller, in which the storage includes: a filter storage structured to store a two-dimensional digital filter that is a filter with no orientation or an even filter with orientation and is a filter that allows a band of a relatively high frequency to pass or a high pass filter, or is a wavelet frame with orientation selectivity or a filter bank with orientation selectivity that are a set of an approximation filter with no orientation and a plurality of detail filters with respective orientations; and an image data storage that stores image data, and the controller executes generation of an edge-induced visual illusion image by applying the two-dimensional digital filter to the image data to extract a component of a relatively high frequency band or a high frequency component, and/or by applying coloring to an edge of the extracted band component or the high frequency component.

Moreover, the present invention relates to a recording medium, which is a non-transitory computer-readable recording medium storing image data of an edge-induced visual illusion image, in which the edge-induced visual illusion image is characterized in that, in image data, a two-dimensional digital filter that is a filter with no orientation or an even filter with orientation and is a filter that allows a band of a relatively high frequency to pass or a high pass filter, or is a wavelet frame with orientation selectivity or a filter bank with orientation selectivity that are a set of an approximation filter with no orientation and a plurality of detail filters with respective orientations is applied, and a component of a relatively high frequency band or a high frequency component is extracted, and/or coloring is applied to an edge of the band component or the high frequency component.

Moreover, the present invention relates to a printing medium on which an edge-induced visual illusion image is printed, in which the edge-induced visual illusion image is characterized in that, in image data, a two-dimensional digital filter that is a filter with no orientation or an even filter with orientation and is a filter that allows a band of a relatively high frequency to pass or a high pass filter, or is a wavelet frame with orientation selectivity or a filter bank with orientation selectivity that are a set of an approximation filter with no orientation and a plurality of detail filters with respective orientations is applied, and a component of a relatively high frequency band or a high frequency component is extracted, and/or coloring is applied to an edge of the band component or the high frequency component.

The present invention achieves an effect of providing an edge-induced visual illusion generation apparatus, a method of generating an edge-induced visual illusion, an edge-induced visual illusion generation program, a recording medium, and a printing medium capable of being applied to any image and automatically generating an edge-induced visual illusion having edges of various shapes without complicated work.

BRIEF DESCRIPTION OF THE DRAWINGS

FIG. 5 is a diagram in which an approximate part is represented by a sign $d_k(1)$ and detail parts are represented by signs (numbers) $d_k(1)$ to $d_k(99)$ in a pinwheel framelet at level k of degree 7;

FIG. 9 is a chart illustrating weighting of Example 1;

FIG. 13 is a chart illustrating weighting of a filter used in Example 2;

FIG. 14 is another chart illustrating the weighting of the filter used in Example 2;

FIG. 15 is still another chart illustrating the weighting of the filter used in Example 2;

FIG. 21 is a chart illustrating weighting used in processing performed on FIG. 20 in Example 4;

FIG. 24 is a chart illustrating weighting used in processing performed on FIG. 23 in Example 4;

FIG. 28 is a chart illustrating weighting of Example 5;

FIG. 30 is a chart illustrating weighting of a filter in maximal overlap multiresolution decomposition using a pinwheel framelet of degree 3;

FIG. 31 is another chart illustrating the weighting of the filter in the maximal overlap multiresolution decomposition using the pinwheel framelet of degree 3;

FIG. 35 is a chart illustrating weighting;

FIG. 37 is a chart illustrating weighting of Example 6;

FIG. 39 is a view illustrating an image in which FIG. 38 is appropriately scaled and superimposed to the original image in FIG. 36;

FIG. 40 is a chart illustrating second weighting of Example 6;

DETAILED DESCRIPTION OF THE INVENTION

Hereinafter, embodiments of an edge-induced visual illusion generation apparatus, a method and a program for generating an edge-induced visual illusion, a printing medium, and a recording medium will be described in detail with reference to the accompanying drawings. It should be noted that the present invention is not limited by those embodiments.

Configuration of Edge-Induced Visual illusion Generation Apparatus

Figure 1:
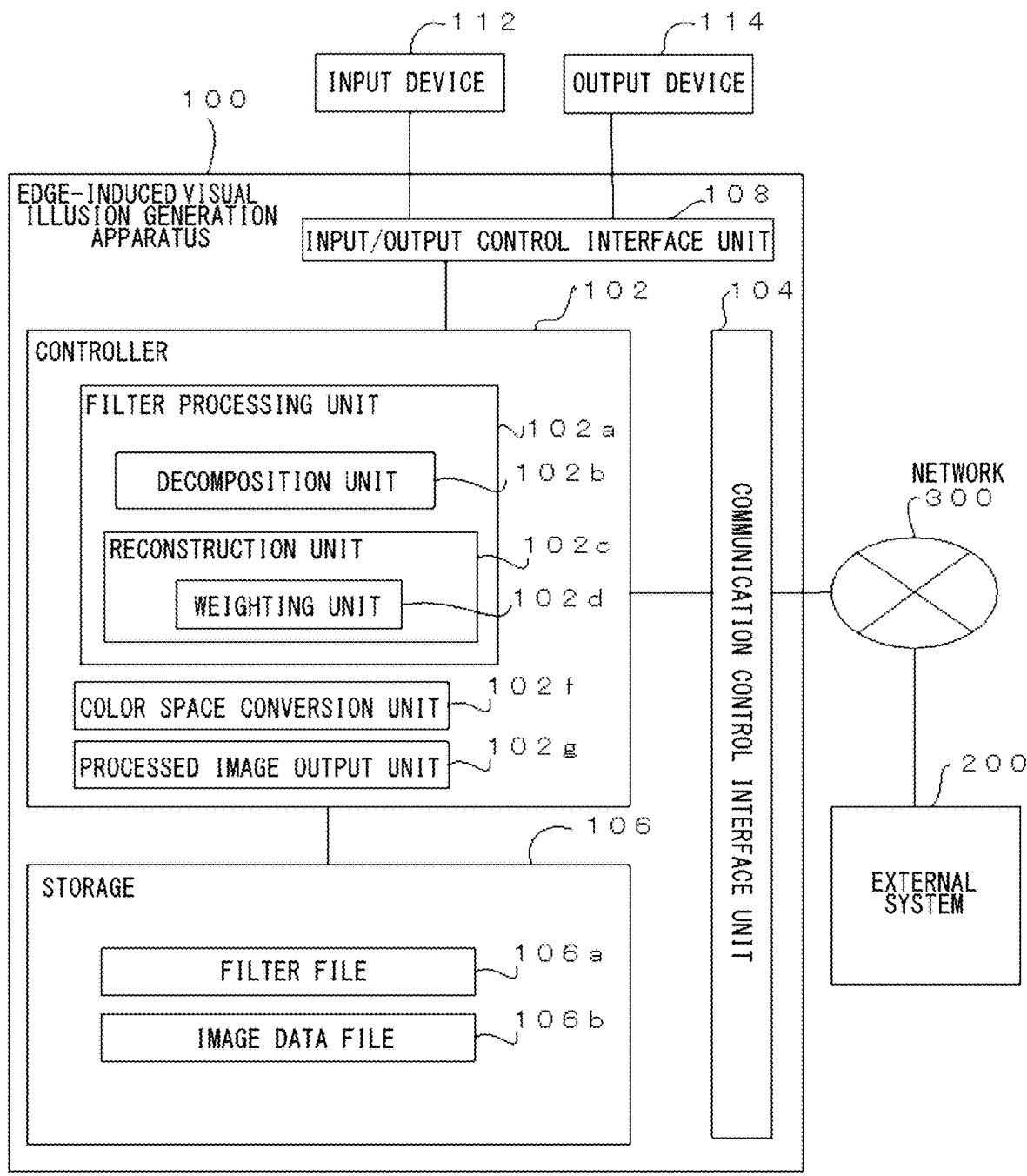
FIG. 1 is a block diagram illustrating an exemplary configuration of an edge-induced visual illusion generation apparatus to which the present embodiment is applied.

A configuration of the present edge-induced visual illusion generation apparatus will be described with reference to FIG. 1. FIG. 1 is a block diagram illustrating an exemplary configuration of the present edge-induced visual illusion generation apparatus to which the present embodiment is applied, and in the configuration, only parts related to the present embodiment are conceptually illustrated.

In FIG. 1, an edge-induced visual illusion generation apparatus 100 schematically includes a controller 102, a communication control interface unit 104, an input/output control interface unit 108, and a storage 106. Here, the controller 102 is a central processing unit (CPU) or the like that centrally controls the entire edge-induced visual illusion generation apparatus 100. The input/output control interface unit 108 is an interface to be connected to an input device 112 and an output device 114. The storage 106 is a unit that stores various databases, tables, and the like. Each unit of the edge-induced visual illusion generation apparatus 100 described above is communicably connected via an arbitrary communication path.

The various files (filter file 106a and image data file 106b) stored in the storage 106 are storage means such as a fixed disk device. For example, the storage 106 stores various programs, tables, files, databases, web pages, and the like, which are used for various processes.

Among those constituent elements of the storage 106, the filter file 106a is a filter storage means that stores a two-dimensional digital filter, which is (1) a filter with no orientation or an even filter with orientation and is (2) a filter that allows a band of a relatively high frequency to pass or a high pass filter, or is (3) an orientation-selective wavelet frame or an orientation-selective filter bank, which are a set of an approximation filter with no orientation and a plurality of detail filters with respective orientations. As for (2), when the filter that allows a band of a high frequency to pass is used, both sides of the edge are made smooth, and an edge-induced visual illusion caused by the edge is generated. (Hereinafter, this is referred to as "visual illusion caused by a smooth edge".) Meanwhile, when the high pass filter is used, smoothness on one side of the edge is lost, and an edge of a type similar to that of the Craik-O'Brien-Cornsweet effect is generated. As for (1), a filter with no orientation, which is obtained by combining a filter with no orientation and a filter with orientation, may be used. In addition, it is not limited thereto, and in a case where an original image includes only area boundaries in a specific direction or edges different for each direction are generated, an even filter with orientation, or a filter obtained by weighting and adding a plurality of even filters with orientation may be used. Here, the even filter indicates a symmetrical filter with the direction of the orientation of the filter serving as an axis. Filtering using a filter that satisfies the conditions (1) and (2) has the effect of generating an edge that surrounds or sandwiches an area where a visual illusion is desired to be generated with a bright edge or a dark edge. A similar effect can be obtained by appropriately using a filter that satisfies the condition (3).

Here, the filter file 106a may store a unit impulse response in which a two-dimensional digital filter is applied beforehand to a unit impulse signal having the image size same as that of the image data. Note that, the filter file 106a may store the orientation-selective wavelet frame or the orientation-selective filter bank, which are a set of an approximation filter with no orientation and a plurality of detail filters with respective orientations, as described in (3) above. Note that the "wavelet" in the present embodiment is not limited to a classical wavelet, a wavelet in a narrow sense, and the like, and includes a wavelet in a broad sense. For example, the wavelet is a finite-length waveform or a wave-like oscillation with an amplitude that amplifies from zero and quickly converges to zero, and examples thereof include pseudo wavelets such as a Gabor filter and a curvelet.

In the present embodiment, in some cases, a pinwheel framelet (see Section "Pinwheel Framelet" to be described later) is used as a FIR filter that has various frequency characteristics and orientations and can be expressed as a differentiable function having a compact support. However, it is not limited thereto, and another framelet or the like, such as, a simple pinwheel framelet (see Non-patent literature 9: Hitoshi Arai et al., "2D tight framelets with orientation selectivity suggested by vision science", JSIAM Letters Vol. 1, 9-12, 2009), a framelet obtained by changing coefficients and/or exponents of terms constituting the definitional equation of the pinwheel framelet (e.g., expression $F^1_{k,1}(\theta_1, \theta_2)$ or expression $F^2_{k,1}(\theta_1, \theta_2)$ to be described in Section [Pinwheel Framelet]), or a framelet obtained by changing coefficients of terms constituting frequency response functions of filters of the simple pinwheel framelet ([Non-patent literature 9]) may be used. Those described above and the pinwheel framelet (in a narrow sense described above) are collectively called a broad-sense pinwheel framelet. Here, the "broad-sense pinwheel framelet" is a set of an approximation filter with no orientation and a plurality of detail filters with respective orientations, and is a filter bank having a degree. In other words, the pinwheel framelet, the simple pinwheel framelet introduced by [Non-patent literature 9], and the one in which filters of those framelets are modified are referred to as the "broad-sense pinwheel framelet". The broad-sense pinwheel framelet is a two-dimensional framelet with orientation selectivity. In addition, the broad-sense pinwheel framelet has the property of being a filter bank that is capable of performing multiresolution decomposition, has a variety of orientation selectivity, and includes finite-length filters. Note that, the pinwheel framelet differs from the simple pinwheel framelet, has a function better than that of the simple pinwheel framelet in reflecting characteristics of human visual information processing in the brain, and also greatly differs from the simple pinwheel framelet in the method of configuration.

Moreover, in the present embodiment, a pinwheel wavelet frame may be used (see Non-patent literature 10).

Figure 2:
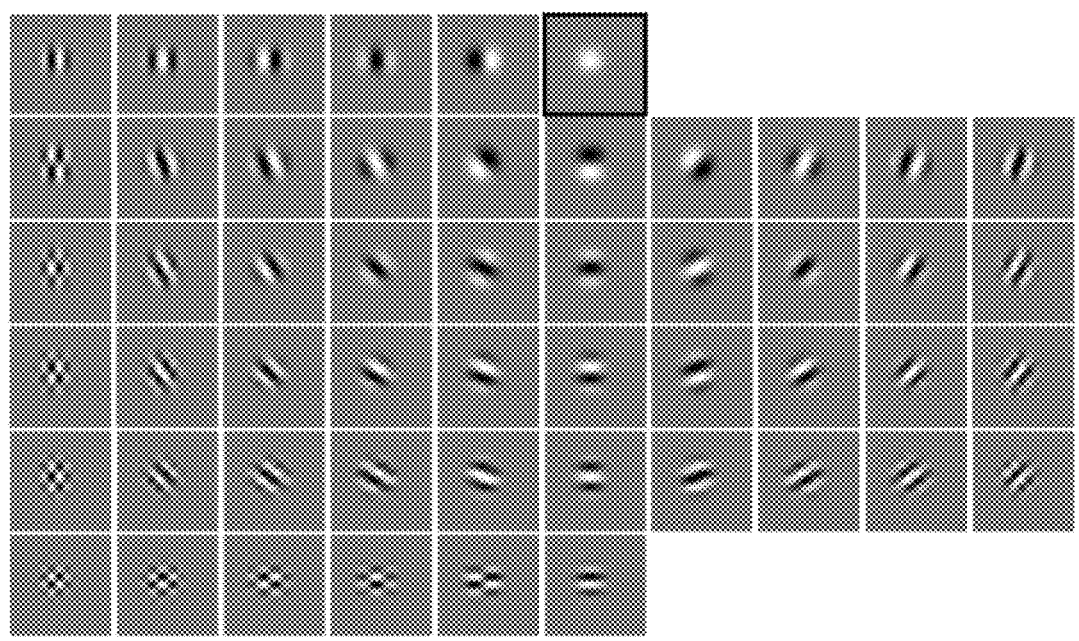
FIG. 2 is a view illustrating filters obtained by calculating the cyclic correlation product of maximal overlap pinwheel framelet filters at level 3 of degree 5 and maximal overlap pinwheel framelet approximation filters at level 1 and level 2 of degree 5.

A pinwheel framelet is, for example, a mathematical model of information processing using simple cells in the human visual cortex. This decomposition is a mathematical model of signals decomposed by simple cells in the human brain. A pinwheel framelet has a degree that is an odd number of three or more. The larger the degree becomes, the more the orientations can be detected, which enables formation of various filters. It has a property in which the number of filters increases and the calculation time increases as the degree increases. Moreover, the number of filters of the pinwheel framelet of degree n is, for example, $(n+1)^2 + (n-1)^2$. Among them, one filter is an approximation filter, and the remaining filters are detail filters. Here, FIG. 2 illustrates filters obtained by calculating the cyclic correlation product of maximal overlap pinwheel framelet filters at level 3 of degree 5 and maximal overlap pinwheel framelet approximation filters at level 1 and level 2 of degree 5 (for an example of the cyclic correlation product, see Hitoshi Arai, "Linear Algebra, Basics and Applications", Nippon Hyoron Sha Co., Ltd. (2006), etc.). Note that the pinwheel framelet is a model neuroscientifically closer to simple cells in V1 of the cerebral cortex than the simple pinwheel framelet.

Since the degree of this pinwheel framelet is 5, as exemplified in FIG. 2, the pinwheel framelet includes, for each level, 6×6 filters on the left side and 4×4 filters on the right side, which are combined to be a set of 52 filters in total. Among them, one filter surrounded by a black rectangle at the central upper part in the drawing is a filter obtained by calculating the cyclic correlation product of the approximation filters from level 1 to level 3, and the other 51 filters are filters obtained by calculating the cyclic correlation product of the detail filters at level 3 and the approximation filters from level 1 to level 2. The orientations of the filters generated by the detail filters are arranged substantially in the direction in which a pinwheel rotates around the filter generated only by the approximation filters. Note that, as will be described later, maximal overlap multiresolution decomposition using a pinwheel framelet of each degree has levels, and level 1 detects the finest portion (high-frequency portion). FIG. 2 illustrates a pinwheel framelet at level 3, and approximate portions (low-frequency portions) are detected as the level increases to 2, 3, and so on. Note that the filter file 106a may store orientation-selective wavelet frames such as a pinwheel framelet, in the form of a function (such as a frequency response function of framelet filters). A specific example of the function will be described later.

Note that various wavelets may be used in the present embodiment without being limited to the above. In the present embodiment, in order to increase and decrease various frequency components and orientation components, the broad-sense pinwheel framelet or the pinwheel wavelet frame having various frequency characteristics and orientations is preferably used. Here, the wavelet is not limited to a classical wavelet, a wavelet in a narrow sense, and the like, and includes a wavelet in a broad sense. For example, the wavelet is a finite-length waveform or a wave-like oscillation with an amplitude that amplifies from zero and quickly converges to zero, and examples thereof include pseudo wavelets such as a Gabor filter and a curvelet. Moreover, the filter file 106a may store a filter group such as an orientation-selective filter bank, and a filter with orientation, without being limited to a frame such as an orientation-selective wavelet frame. Examples of the filters with respective orientations include a plurality of detail filters with respective orientations, and for example, components such as subband signals are extracted by the filters. Note that, while the length of the filters included in the pinwheel wavelet frame changes according to the number of pixels of the original image, the broad-sense pinwheel framelet has a property in which the length of the filters is independent of the number of pixels. For example, the pinwheel framelet is a two-dimensional framelet with orientation selectivity, which is one type of a wavelet frame. Moreover, it is not limited to the pinwheel framelet with multidirectional orientations, and a biorthogonal wavelet filter bank in which the orientation includes the horizontal direction, the vertical direction, and the diagonal direction may be used.

Here, the filters stored in the filter file 106a are not limited to the orientation-selective wavelet frames such as the pinwheel framelet and the orientation-selective filter bank itself, and may be filters having predetermined frequency characteristics and/or predetermined orientations formed of those mentioned above. For example, the filters stored in the filter file 106a may be a unit impulse response of a unit impulse signal, and such a digital filter is a unit impulse response of a unit impulse signal obtained by, when reconstruction is performed by adding a subband signal obtained by performing multiresolution decomposition on the unit impulse signal having the number of pixels same as that of the image data using the broad-sense pinwheel framelet, attenuating or amplifying the subband signal corresponding to at least one of the filters having predetermined frequency characteristics and/or predetermined orientations among a plurality of filters. Such a unit impulse response is used for high-speed calculation of image data of a target original image.

Further, as another example, the filters stored in the filter file 106a may be a digital filter for image processing, which is generated in such a manner that predetermined weight is added to the frequency response function for each filter of the broad-sense pinwheel framelet to be multiplied and added according to a predetermined method so that a filter coefficient is calculated, and the predetermined weight may be weight that attenuates or amplifies the subband signal corresponding to at least one of the filters having predetermined frequency characteristics and/or predetermined orientations among a plurality of filters. Examples of the filters having predetermined frequency characteristics and/or predetermined orientations and examples of the weighting will be described later.

The image data file 106b is an image data storage means that stores image data. For example, in a case where, among edge-induced visual illusions, a visual illusion of brightness caused by an edge is generated, the image data file 106b may store n-gradation grayscale image as image data of an original image (n is an integer of two or more). Although the visual illusion effect of the visual illusion image may be changed by the gradation of the original image, gradation widths may not be uniform. In addition, in a case where, among edge-induced visual illusions, a watercolor illusion is generated, arbitrary coloring can be performed after an edge is generated, whereby both a color image and a grayscale image can be used as the original image to be stored in the image data file 106b. In addition, in a case where the edge-induced visual illusion is used for the purpose of improving contrast, an arbitrary image data such as a color image and a grayscale image can be used as an original image. Here, the image data to be stored in the image data file 106b may be image data in which a color tone, a gradation value, and the like are described beforehand for each color component, and may be image data not described by color components used in the present embodiment. Note that, in the latter case, it is converted into a desired color space by a color space conversion unit 102f, and is described as intensity of each color component. Further, the image data to be stored in the image data file 106b may be image data input via the input device 112, or may be image data received from an external system 200 or the like via network 300. Furthermore, the image data may be image data of a color image, or may be grayscale image data. In the case of the color image, for example, the processing according to the present invention may be performed on the basis of image data according to CIE L*a*b* color space or the like. Note that the original image (data) before being subject to the multiresolution decomposition using the orientation-selective wavelet frame such as a pinwheel framelet is referred to as an original image (data), and the image (data) after being subject to the reconstruction based on the subband signal is referred to as a reconstructed image (data). In addition, an image (data) obtained by processing the subband signal in a decomposition phase of multiresolution decomposition, or an image (data) reconstructed by adding the subband signal in a synthesis phase of multiresolution decomposition is referred to as a processed image (data). That is, the latter processed image (data) is one form of the reconstructed image (data) while the former processed image (data) is not the reconstructed image (data). In order to clarify the distinction between the two, hereinafter, the former processed image (data) may be referred to as a "coefficient output processed image (data)", and the latter processed image (data) may be referred to as a "reconstruction processed image (data)". Besides, an image in which some kind of image processing is applied to the reconstruction processed image (data) is also referred to as a processed image (data). Here, the image data file 106b may store, as image data, a unit impulse signal for an image size (the number of pixels) same as that of the image data of the target original image. The unit impulse signal stored in the image data file 106b is input to the filter bank stored in the filter file 106a as image data in a similar manner, and the output unit impulse response is used for high-speed calculation of the image data of the target original image. Note that the image data is, for example, two-dimensional image data in a raster format or a vector format. The image may be any image representing, for example, a design, a photograph, or a character. The image is not limited to a static image, but may be a dynamic image (video).

Returning to FIG. 1 again, the input/output control interface unit 108 controls the input device 112 and the output device 114. Here, as the output device 114, a display device such as a monitor (including a home television), a printing device such as a printer, and the like can be used. Moreover, as the input device 112, a keyboard, a mouse, a microphone, and the like can be used in addition to an imaging device such as a camera, an input device connected to an external storage medium, and the like.

In FIG. 1, the controller 102 includes an internal memory for storing a control program such as an operating system (OS), a program defining various processing procedures and the like, and required data. The controller 102 performs information processing for executing various types of processing using those programs and the like. The controller 102 includes, from the functional concept perspective, a filter processing unit 102a, a color space conversion unit 102f, and a processed image output unit 102g. Here, the filter processing unit 102a includes a decomposition unit 102b, and a reconstruction unit 102c, and the reconstruction unit 102c further includes a weighting unit 102d.

Among them, the filter processing unit 102a is a filter processing means that applies, to image data, a two-dimensional digital filter, which is a filter with no orientation or an even filter with orientation and is a filter that allows a band of a relatively high frequency to pass or a high pass filter, or is an orientation-selective wavelet frame or an orientation-selective filter bank, which are a set of an approximation filter with no orientation and a plurality of detail filters with respective orientations. More specifically, the filter processing unit 102a may generate an edge-induced visual illusion image by applying the two-dimensional digital filter to extract the component of the band of a relatively high frequency or the high frequency component, or may generate an edge-induced visual illusion image by applying coloring to the edge of the extracted band component or the high frequency component. For example, the filter processing unit 102a may generate the "visual illusion caused by a smooth edge" invented by the present inventors by applying the filter that allows the band of a relatively high frequency to pass (high-pass band pass filter) to smooth both sides of the edge. Besides, the filter processing unit 102a may generate the Craik-O'Brien-Cornsweet effect in which one side of the edge is not smooth by applying a high pass filter (HPF).

Further, in the visual illusion image such as the "visual illusion caused by a smooth edge" and the Craik-O'Brien-Cornsweet effect, the filter processing unit 102a may perform multivalued image gradation (at least ternary image gradation) processing at a predetermined gradation threshold value to generate a visual illusion image having the sumi painting effect. For example, the filter processing unit 102a may set a value larger than 128 as 128+α (α is an appropriate value) and set a value less than 128 as 128−α in 255 gradation grayscale visual illusion image, thereby generating image data that exerts the sumi painting effect. Furthermore, the filter processing unit 102a may use the visual illusion image such as the "visual illusion caused by a smooth edge" and the Craik-O'Brien-Cornsweet effect to improve contrast of a photograph or the like. For example, the filter processing unit 102a may apply the two-dimensional digital filter to brightness image data (L* image data according to CIE L*a*b*, etc.) of the original image and superimposes the obtained visual illusion image on the original image, thereby generating a processed image in which the contrast is improved.

The filter processing unit 102a may use the visual illusion image such as the "visual illusion caused by a smooth edge" and the Craik-O'Brien-Cornsweet effect to generate the watercolor illusion that is an edge-induced visual illusion in terms of color. For example, the filter processing unit 102a may generate the watercolor illusion image by applying the filter that allows the band of a relatively high frequency to pass (high-pass band pass filter) to extract the band component for causing the "visual illusion caused by a smooth edge" and to apply coloring to the edge of the extracted band component. As another example, the filter processing unit 102a may generate the watercolor illusion image by applying the high pass filter (HPF) to extract the high frequency component and to apply coloring to the edge of the extracted high frequency component. As an example of the edge coloring, the filter processing unit 102a may set the color of the area inside the edge (ground color) to white, and may color the inner edge with a color desired to be colored in the watercolor illusion in the area. As a result, the area inside the colored edge exhibits the visual illusion effect in which the entire area appears to look thinly colored. At the time of coloring the edge, the edge may be colored such that the color changes according to the change in the gradation of the edge, or the edge may be colored to a uniform color.

In the case of using the orientation-selective filter bank or the like such as the broad-sense pinwheel framelet and the pinwheel wavelet frame, for example, the filter processing unit 102a may perform weighting processing and the like in which the subband signals corresponding to the approximation filter and the high-degree detail filter are relatively attenuated and the subband signals corresponding to the low-degree detail filter are relatively amplified. Further, the filter processing unit 102a may perform multiresolution decomposition using the orientation-selective wavelet frame or the orientation-selective filter bank, which are a set of an approximation filter with no orientation and a plurality of detail filters with respective orientations, obtain subband signals, appropriately weight and add the obtained subband signals, thereby reconstructing the image. Note that the filter processing unit 102a may be configured as a circuit or the like that functions as a digital filter. Here, as illustrated in FIG. 1, the filter processing unit 102a includes the decomposition unit 102b and the reconstruction unit 102c in the present embodiment, as described below.

Figure 3:
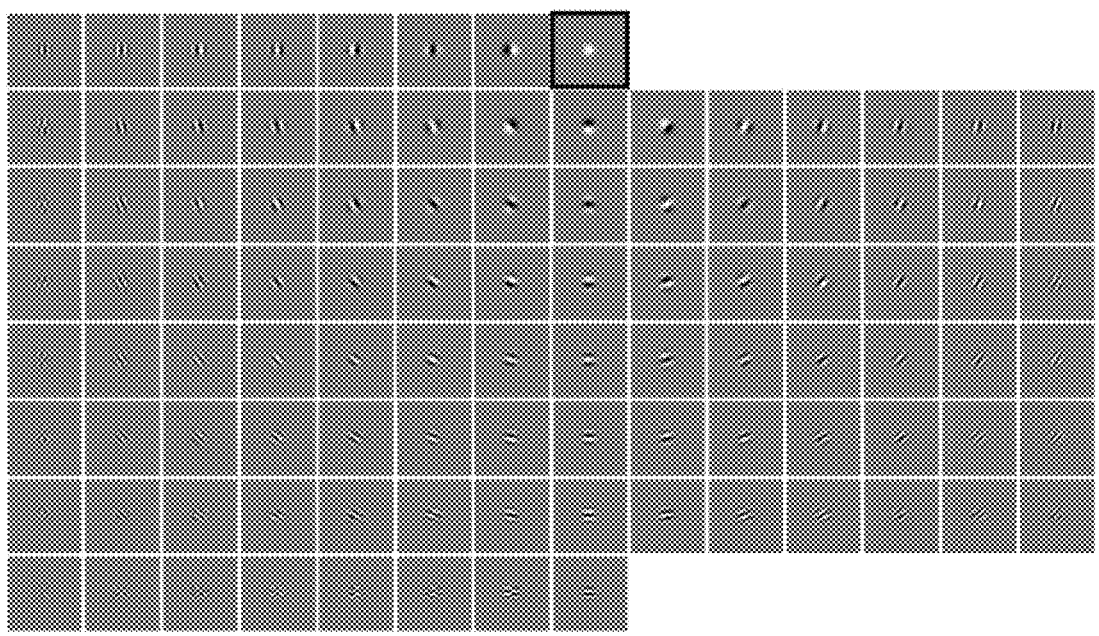
FIG. 3 is a view illustrating filters obtained by calculating the cyclic correlation product of maximal overlap pinwheel framelet filters at level 2 (high-frequency side) of degree 7 and a maximal overlap pinwheel framelet approximation filter at level 1.
Figure 4:
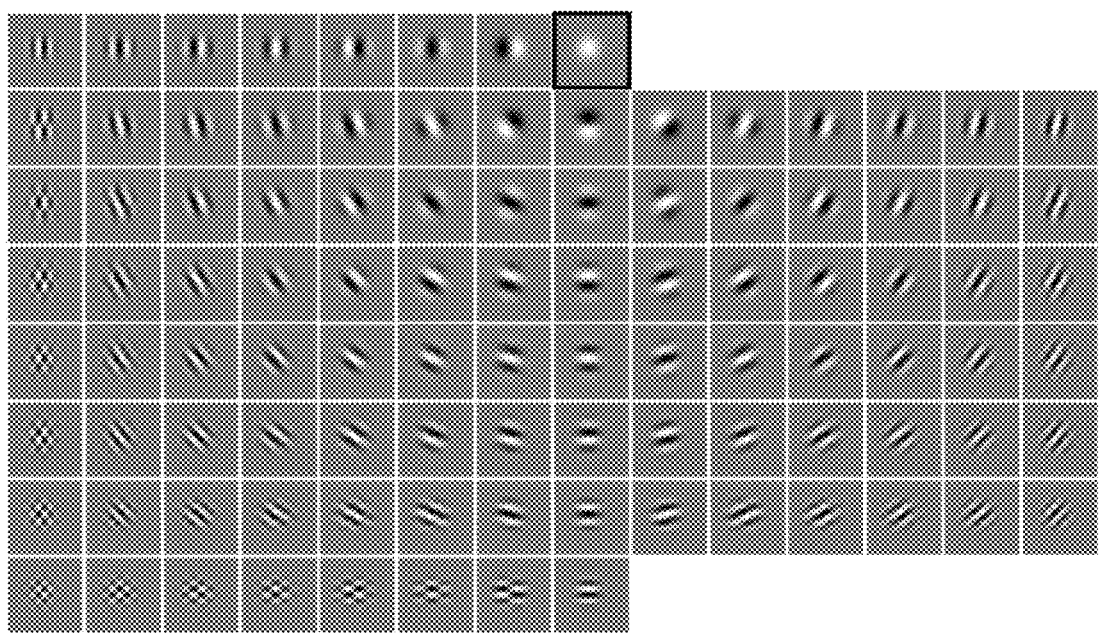
FIG. 4 is a view illustrating filters obtained by calculating the cyclic correlation product of maximal overlap pinwheel framelet filters at level 3 (low-frequency side) of degree 7 and maximal overlap pinwheel framelet approximation filters at level 1 and level 2.

Among them, the decomposition unit 102b is a decomposition means that performs multiresolution decomposition on image data to obtain subband signals. For example, the decomposition unit 102b is a decomposition means that performs multiresolution decomposition using a two-dimensional filter such as a pinwheel framelet stored in the filter file 106a to obtain subband signals. Here, there are two types of subband signals, that is, subband signals in the decomposition phase of the multiresolution decomposition, and subband signals in the synthesis phase of the multiresolution decomposition. In order to clarify the distinction between the two, hereinafter, the subband signal in the decomposition phase may be referred to as a "decomposition subband signal", and the subband signal in the synthesis phase may be referred to as a "synthesis subband signal". Here, the "multiresolution decomposition" includes maximal overlap multiresolution decomposition, maximum thinning multiresolution decomposition, and partial thinning partial multiresolution decomposition (for an example of the maximal overlap multiresolution decomposition, see Hitoshi Arai, "Wavelet", Kyoritsu Shuppan Co., Ltd. (2010), etc.). Although the cyclic correlation product and the cyclic convolution product are used when multiresolution decomposition is calculated by the decomposition unit 102b, it may be calculated by a publicly known high-speed calculation method using a fast Fourier transform. As described above, multiresolution decomposition using the orientation-selective wavelet frame such as the pinwheel framelet has levels. FIG. 3 and FIG. 4 are views for illustrating the difference depending on the level of the pinwheel framelet. FIG. 3 illustrates filters obtained by calculating the cyclic correlation product of maximal overlap pinwheel framelet filters at level 2 (high-frequency side) and a maximal overlap pinwheel framelet approximation filter at level 1. FIG. 4 illustrates filters obtained by calculating the cyclic correlation product of the maximal overlap framelet filters at level 3 (low-frequency side) and maximal overlap pinwheel framelet approximation filters at level 1 and level 2. Since the degree of both of them is 7, the number of filters is $(7+1)^2+(7-1)^2=100$.

As an example, the decomposition unit 102b first detects the finest portion (high-frequency portion) by the maximal overlap multiresolution decomposition using the pinwheel framelet at level 1, and detects approximate portions (low-frequency portions) as the level increases to 2, 3, and so on.

The multiresolution decomposition using the pinwheel framelet includes the decomposition phase and the synthesis phase. Each phase includes a filter bank including an array of approximation filters and detail filters. After performing the image processing in the decomposition phase and the synthesis phase, the decomposition unit 102b ultimately decomposes the original image data into image signals (i.e., subband signals) of the number that is "the number of filters×level".

For example, in the case of maximal overlap multiresolution decomposition at level 5 using a pinwheel framelet of degree 7, the subband signal at a certain level k (k=1 to 5) includes one approximate part obtained by one approximation filter and 99 detail parts obtained by 99 detail filters. FIG. 5 is a diagram in which the approximate part is represented by a sign $a_k(1)$ and the detail parts are represented by signs (numbers) $d_k(1)$ to $d_k(99)$ in the pinwheel framelet at level k of degree 7. Note that the position of the sign (number) corresponds to the position of each filter in FIG. 3 (k=2) or FIG. 4 (k=3). That is, $a_k(1)$ and $d_k(1)$ to $d_k(99)$ represent subband signals obtained by the filter at the corresponding position in FIG. 3 or FIG. 4. As described above, the multiresolution decomposition using the pinwheel framelet includes the decomposition phase and the synthesis phase, and signals of the number that is "the number of filters×level" can be obtained after the synthesis phase. Those signals are subband signals, which may be referred to as synthesis subband signals in order to distinguish it from decomposition subband signals after the decomposition phase and before the synthesis phase. The following table is a list that lists terms along the progression of the image processing from the original image. The same applies to the case of using the orientation-selective wavelet frame or the orientation-selective filter bank other than the broad-sense pinwheel framelet.

[Table: Term List]
Original Image
<Decomposition Phase>
Subband signal in decomposition phase (decomposition subband signal)
Detail coefficient output from decomposition phase (decomposition detail coefficient)
Approximation coefficient output from decomposition phase (decomposition approximation coefficient)
<Various Processes>
Processed image (coefficient output processed image)
<Synthesis Phase>
Subband signal in synthesis phase (synthesis subband signal)
Detail coefficient output from synthesis phase
Approximation coefficient output from synthesis phase
<Reconstruction>
Processed image (reconstruction processed image)

The reconstruction unit 102c is a reconstruction means that adds the subband signals obtained by the decomposition unit 102b to reconstruct the image, thereby obtaining reconstructed image data. For example, the reconstruction unit 102c adds the subband signals of the approximate part obtained by the approximation filter at the maximum level described above and the subband signals of the detail part obtained by all detail filters to reconstruct the image, thereby obtaining the reconstructed image data. At this time, the reconstruction unit 102c reproduces an image same as the original image in a case where the pinwheel framelet has a perfect reconstruction property and the weighting unit 102d does not perform processing to be described later. In other words, the reconstruction unit 102c attenuates (deletes) or amplifies (emphasizes) specific subband signals on the basis of the processing of the weighting unit 102d, and then adds the subband signals, thereby obtaining reconstructed image data different from the original image, that is, processed image data.

Here, the relationship between the perfect reconstruction property and the weighting processing (image processing) will be described using the signs (numbers) mentioned above. Supposing that an input signal (original signal) of the original image is x, the perfect reconstruction property of the maximal overlap multiresolution decomposition is expressed by the following equation.

$$x=a_5(1)+(d_5(1)+\ldots+d_5(99))+\ldots+(d_1(1)+\ldots+d_1(99))$$

Here, appropriate coefficients of real numbers are given to the approximate part and each detail part to be $a_{5,1}$, $b_{5,1}, \ldots, b_{5,99}, \ldots, b_{1,1}, \ldots, b_{1,99}$. In this case, the reconstructed image (signal) is expressed by the following equation.

$$y = a_{5,1}a_5(1) + (b_{5,1}d_5(1) + \ldots + b_{5,99}d_5(99)) + \ldots + (b_{1,1}d_1(1) + \ldots + b_{1,99}d_1(99))$$

Here, when each coefficient $a_{5,1} = b_{5,1} = \ldots = b_{5,99} = \ldots = b_{1,99} = 1$, it is clear that x=y (the original image and the reconstructed image are the same), which is perfect reconstruction. In the present embodiment, for example, the weighting unit 102d sets, to the coefficients $a_{5,1}, b_{5,1}, \ldots, b_{5,99}, \ldots, b_{1,1}, \ldots, b_{1,99}$ of the subband signals corresponding to the filters having predetermined frequency characteristics and/or predetermined orientations, a value other than one, thereby generating the reconstructed image (i.e., processed image) that is not identical to the original image.

Here, classification of the detail filters will be described. The detail filters can be classified into five types on the basis of their orientation. Specifically, if an axis orthogonal to a certain direction is referred to as an "orthogonal axis", the detail filters can be classified into five types, that is, (1) a detail filter with an orientation in the same direction as the orthogonal axis, (2) a detail filter with an orientation in the direction perpendicular to the orthogonal axis, (3) a detail filter with an orientation at a positive angle relative to the orthogonal axis, (4) a detail filter with an orientation at a negative angle relative to the orthogonal axis, and (5) a detail filter whose orientation is not uniquely defined. The angle θ relative to the orthogonal axis is represented by $-90° \leq \theta \leq +90°$, where the counterclockwise direction is defined as the positive direction. The detail filter with the orientation horizontal or perpendicular to the orthogonal axis (θ=0°, 90° is classified as (1) or (2), and therefore is not classified as (3) or (4). Moreover, since the "(5) detail filter whose orientation is not uniquely defined" includes orientations at both a positive angle and a negative angle, the absolute values of which relative to the orthogonal axis are the same, it is not classified as (3) or (4).

For example, in the example of FIG. 5, the subband signals corresponding to the "(1) detail filter with an orientation in the same direction as the orthogonal axis" are $d_k(15), d_k(23), d_k(31), d_k(39), d_k(47), d_k(55)$, and $d_k(63)$. The subband signals corresponding to the "(2) detail filter with an orientation in the direction perpendicular to the orthogonal axis" are $d_k(1)$ to $d_k(7)$. The subband signals corresponding to the "(3) detail filter with an orientation at a positive angle relative to the orthogonal axis" are $d_k(64)$ to $d_k(99)$. The subband signals corresponding to the "(4) detail filter with an orientation at a negative angle relative to the orthogonal axis" are $d_k(9)$ to $d_k(14), d_k(17)$ to $d_k(22), d_k(25)$ to $d_k(30), d_k(33)$ to $d_k(38), d_k(41)$ to $d_k(46)$, and $d_k(49)$ to $d_k(54)$. The subband signals corresponding to the "(5) detail filter whose orientation is not uniquely defined" are $d_k(8), d_k(16), d_k(24), d_k(32), d_k(40), d_k(48)$, and $d_k(56)$ to $d_k(62)$.

The detail filters can also be characterized by frequency characteristics thereof. Specifically, the detail filters spread from the approximate part concentrically with the approximate filter of the pinwheel framelet at the center, and have a characteristic that allows higher-frequency components to pass at a larger distance from the center and allows lower-frequency components to pass at a smaller distance from the center. In other words, the detail filters on the side farther from the approximate filter in the filter arrangement of the pinwheel framelet obtain the subband signals of the higher-frequency components, and the detail filters on the side nearer to the approximate filter in the filter arrangement of the pinwheel framelet obtain the subband signals of the lower-frequency components.

In the example of FIG. 5, the subband signals corresponding to the detail filter having the frequency characteristic on the lowest frequency side are $d_k(7), d_k(14), d_k(15)$, and $d_k(64)$. The subband signals corresponding to the detail filter having the frequency characteristic on the next low frequency side are $d_k(6), d_k(13), d_k(21)$ to $d_k(23), d_k(65), d_k(70)$, and $d_k(71)$. The subband signals corresponding to the detail filter having the frequency characteristic on the next low frequency side are $d_k(5), d_k(12), d_k(20), d_k(28)$ to $d_k(31), d_k(66), d_k(72)$, and $d_k(76)$ to $d_k(78)$. The subband signals corresponding to the detail filter having the frequency characteristic on the next low frequency side (relatively medium frequency) are $d_k(4), d_k(11), d_k(19), d_k(27), d_k(35)$ to $d_k(39), d_k(67), d_k(73), d_k(79)$, and $d_k(82)$ to $d_k(85)$. The subband signals corresponding to the detail filter having the frequency characteristic on the next low frequency side (relatively high frequency side) are $d_k(3), d_k(10), d_k(18), d_k(26), d_k(34), d_k(42)$ to $d_k(47), d_k(68), d_k(74), d_k(80), d_k(86)$, and $d_k(88)$ to $d_k(92)$. The subband signals corresponding to the detail filter having the frequency characteristic on the next low frequency side (relatively highly high frequency side) are $d_k(2), d_k(9), d_k(17), d_k(25), d_k(33), d_k(41), d_k(49)$ to $d_k(55), d_k(69), d_k(75), d_k(81), d_k(87), d_k(93)$, and $d_k(94)$ to $d_k(99)$. The subband signals corresponding to the detail filter having the frequency characteristic on the next low frequency side (on the highest frequency side) are $d_k(1), d_k(8), d_k(16), d_k(24)$ to $d_k(32), d_k(40), d_k(48)$, and $d_k(56)$ to $d_k(63)$.

The classification of the detail filters has been described above. Here, as illustrated in FIG. 1, the reconstruction unit 102c includes the weighting unit 102d.

The weighting unit 102d is a weighting means that attenuates or amplifies the subband signal corresponding to a filter having a predetermined frequency characteristic (specific frequency characteristic to be defined) and a predetermined orientation (specific orientation to be defined) as necessary. For example, the weighting unit 102d may perform weighting in which the synthesis subband signals corresponding to, among a plurality of filters, the approximation filter and the detail filter on the side far from the approximation filter in the filter arrangement are relatively attenuated and the synthesis subband signals corresponding to the detail filter on the close side of the approximation filter in the filter arrangement are relatively amplified, whereby image processing is performed to obtain the edge-induced visual illusion component. More specifically, the weighting coefficient for the synthesis subband signals corresponding to the approximation filter of the pinwheel framelet described above and for the synthesis subband signals corresponding to the detail filter having the frequency characteristic on the high frequency side located far from the approximation filter may be set to a value close to zero, and the weighting coefficient for the synthesis subband signals corresponding to the detail filter having the frequency characteristic on the high frequency side located close to the approximation filter may be set to a value close to one. Further, the weighting unit 102d may perform weighting in which the synthesis subband signals corresponding to the detail filter having a predetermined orientation as necessary in addition to a predetermined frequency characteristic are attenuated or amplified, whereby image processing is performed to increase or decrease a predetermined orientation component. For example, the weighting coefficient for the synthesis subband signals corresponding to the detail filter having a predetermined orientation in addition to a predetermined frequency characteristic of the pinwheel framelet described above may be set to a value close to one, and the others may be set to a value close to zero, whereby an edge-induced visual illusion with orientation added can be generated.

Here, the weighting unit 102d may perform weighting by multiplying the subband signals obtained by the decomposition unit 102b by the weighting coefficient and adding them, the weighting may be performed on the frequency response function of the framelet filter stored in a function form, each filter coefficient may be derived thereafter, or each weighted frequency response function may be multiplied and added according to a predetermined method to obtain the filter coefficient to be stored in the filter file 106a, thereby quickly obtaining the reconstructed image data. Moreover, filters in the decomposition phase and/or the synthesis phase may be weighted. Note that, under the weighting process performed by the weighting unit 102d, the filter processing unit 102a may obtain and store the unit impulse response in response to the unit impulse signal having the number of pixels same as that of the image data in the filter file 106a beforehand, whereby the reconstructed image data can be quickly obtained using the unit impulse response. That is, the filter processing unit 102a can quickly obtain the processed image data by obtaining the cyclic convolution product using the unit impulse response for new image data.

In the present embodiment, for example, the weighting unit 102d may specify a predetermined frequency characteristic according to a position in a predetermined filter arrangement based on orientation at each level of the pinwheel framelet and/or according to a level in the multiresolution decomposition whereby the weighting is performed such that a predetermined frequency component can be obtained. For example, the weighting unit 102d may perform weighting that relatively attenuates the subband signals corresponding to the approximation filter at a predetermined level in the multiresolution decomposition, whereby image processing is performed such that the low frequency components are removed and the high frequency components can be obtained. For this processing, assuming that the decomposition unit 102b performs the multiresolution decomposition up to a predetermined level, the weighting unit 102d may perform weighting that relatively attenuates the subband signals in the approximate part obtained by the approximation filter at the maximum level (e.g., setting a coefficient $a_{k,1}$ of the approximate part at a predetermined level that is the maximum level to zero). Not limited to this, in the case where the decomposition unit 102b performs the multiresolution decomposition up to a level higher than the predetermined level, the weighting unit 102d may perform weighting that relatively attenuates the detail part at a level higher than the predetermined level and the approximate part at the maximum level.

Further, the weighting unit 102d may perform weighting in which the subband signals corresponding to, among a plurality of filters, the detail filter on the close side of the approximation filter in the filter arrangement (low-frequency side) are relatively amplified and the subband signals corresponding to the approximation filter and the detail filter on the side far from the approximation filter in the filter arrangement are relatively attenuated, whereby image processing is performed to obtain the edge-induced visual illusion effect. More specifically, the coefficient for the subband signals corresponding to the approximation filter of the pinwheel framelet described above and for the subband signals corresponding to the detail filter having the frequency characteristic on the high frequency side located far from the approximation filter may be set to a value close to zero, and the coefficient for the subband signals corresponding to the detail filter having the frequency characteristic on the low frequency side located close to the approximation filter may be set to a value close to one.

Returning to FIG. 1 again, the color space conversion unit 102f is a color space conversion means that performs conversion of the color space, decomposition and synthesis of the color components, and the like. For example, even in a case where the visual illusion image is calculated as a grayscale, the color space conversion unit 102f may convert the image into a color image in which only brightness changes. Further, in a case where the image data stored in the image data file 106b is color image data and the data is not described using the color components used in the present embodiment, the color space conversion unit 102f may convert the image data into that in an intended color space (e.g., CIE L*a*b* color space). To the contrary, in a case where the image data stored in the image data file 106b is not a color image, the color space conversion unit 102f may perform conversion of coloring the visual illusion image data to be output. In addition, the color space conversion unit 102f adjusts or changes the gradation of the image data stored in the image data file 106b (changing a normal image to an n-gradation image, changing or adjusting the n-gradation to an m-gradation, etc.), for example. If necessary, the color space conversion unit 102f performs, in the image data reconstruction processing using the reconstruction unit 102c, synthesis of the color components, conversion of the color space, scale conversion of brightness and color, adjustment and changing of the gradation of the image data, and the like.

The processed image output unit 102g is a processed image output means that outputs, to the output device 114, the processed image data for causing the edge-induced visual illusion to occur (coefficient output processed image data, reconstruction processed image data, or the like), which is obtained by the filter processing unit 102a. For example, the processed image output unit 102g may output the processed image for display to a display device such as a monitor, or may output the processed image for printing to a printing device such as a printer to produce a printing medium, or may output the processed image data to a recording medium storage device and store the processed image data in a recording medium to produce the recording medium. The medium to be subject to printing may be, for example, paper, plastic, glass, metal, transparent sheet (e.g., OHP sheet), or the like, or may be in the form of, for example, a flyer, a fan, a card, a picture book, a New Year's card, a Christmas card, a business card, a container such as a can, or the like. Further, the processed image output unit 102g may divide the visual illusion image and output them to a plurality of media (e.g., output the edge and the ground to different media) to superimpose them, whereby the visual illusion can be perceived. Note that, according to the form to be output, the processed image output unit 102g may change the design (e.g., the size is changed to a postcard size) depending on its intended use. Furthermore, the processed image output unit 102g may transmit the processed image data to the external system 200 via the network 300.

In other words, the edge-induced visual illusion generation apparatus 100 may be communicably connected to the network 300 via a communication device such as a router, and a wired or wireless communication line such as a dedicated line. In FIG. 1, the communication control interface unit 104 performs communication control between the edge-induced visual illusion generation apparatus 100 and the network 300 (or a communication device such as a router). In other words, the communication control interface unit 104 is an interface connected to a communication device (not illustrated) such as a router, which is connected to a communication line or the like, and has a function of performing data communication with another terminal via a communication line. In FIG. 1, the network 300 has a function of mutually connecting the edge-induced visual illusion generation apparatus 100 and the external system 200, and is, for example, the Internet or the like.

In FIG. 1, the external system 200 is mutually connected to the edge-induced visual illusion generation apparatus 100 via the network 300, and may have a function of providing a program for causing an external database related to image data or a pinwheel framelet or a computer to function as the edge-induced visual illusion generation apparatus. Here, the external system 200 may be configured as a WEB server, an ASP server, or the like. Moreover, the hardware configuration of the external system 200 may include an information processing apparatus such as a commercially available workstation and a personal computer, and an accessory device thereof. Each function of the external system 200 is achieved by a CPU, a disk device, a memory device, an input device, an output device, a communication control device, and the like in the hardware configuration of the external system 200, programs for controlling those devices, and the like.

This is the end of the description regarding the configuration of the edge-induced visual illusion generation apparatus 100 according to the present embodiment.

Processing of Edge-Induced Visual Illusion Generation Apparatus 100

Figure 6:
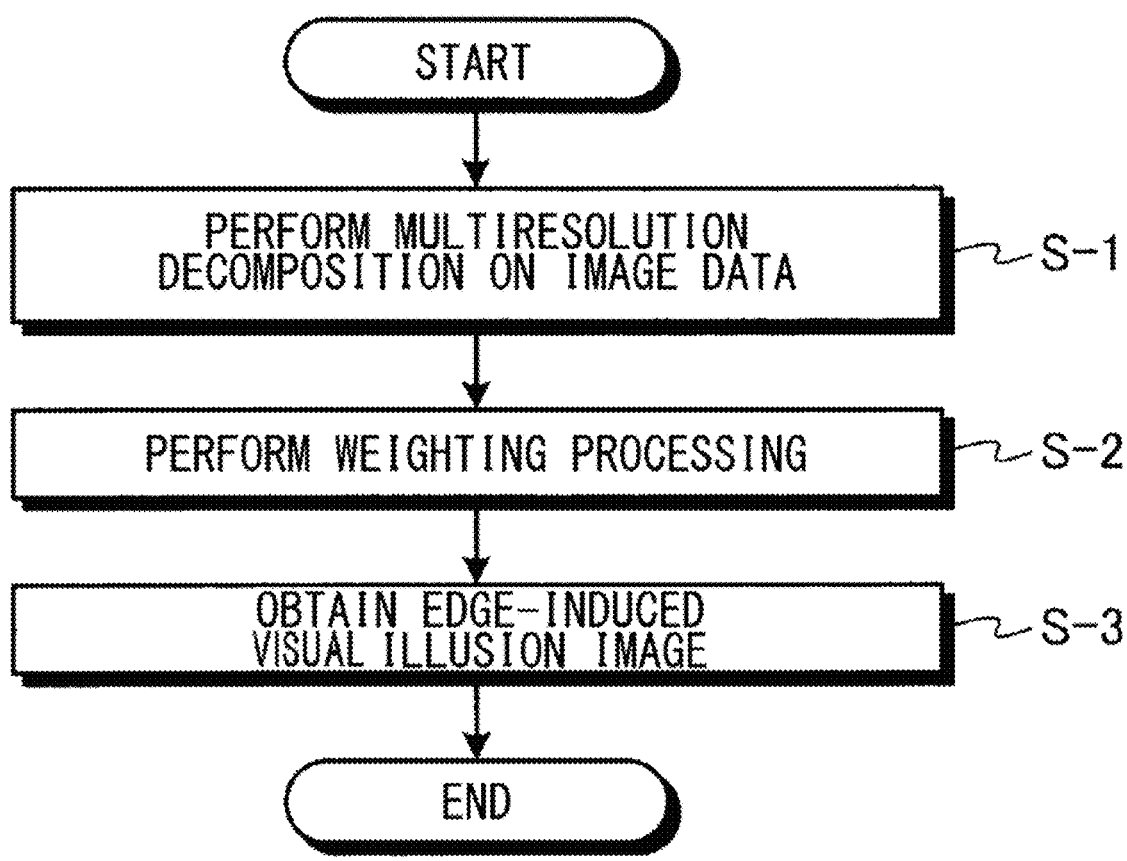
FIG. 6 is a flowchart illustrating an example of basic processing of an edge-induced visual illusion generation apparatus 100 according to the present embodiment.

Next, exemplary processing of the present edge-induced visual illusion generation apparatus 100 configured as above according to the present embodiment will be described in detail with reference to FIGS. 6 and 7.

Basic Processing

First, the basic processing as an example of the image processing executed by the edge-induced visual illusion generation apparatus 100 will be described.

As basic processing, the edge-induced visual illusion generation apparatus 100 stores, in the filter file 106a of the storage 106, a two-dimensional digital filter, which is a filter with no orientation or an even filter with orientation and is a filter that allows a band of a relatively high frequency to pass or a high pass filter, or is an orientation-selective wavelet frame or an orientation-selective filter bank, which are a set of an approximation filter with no orientation and a plurality of detail filters with respective orientations.

The controller 102 of the edge-induced visual illusion generation apparatus 100 applies the two-dimensional digital filter stored in the filter file 106a to the image data of two or more gradations stored in the image data file 106b, thereby generating the edge-induced visual illusion image. Here, the basic processing in the case where multiresolution decomposition is used for generating the edge-induced visual illusion will be described with reference to FIGS. 6 and 7. FIG. 6 is a flowchart illustrating an example of the basic processing of the edge-induced visual illusion generation apparatus 100 according to the present embodiment. Note that the multiresolution decomposition may not be used for generating the edge-induced visual illusion, and a predetermined two-dimensional digital filter may be applied in the processing.

First, the decomposition unit 102b performs, on the image data stored in the image data file 106b, the maximal overlap multiresolution decomposition using the broad-sense pinwheel framelet or the pinwheel wavelet frame stored in the filter file 106a to obtain subband signals (step S-1). FIG. 7 is a diagram illustrating an exemplary filter bank of the decomposition phase and the synthesis phase of the multiresolution decomposition using the pinwheel framelet. The numbers in the drawing indicate levels. The sign "PW" indicates a detail filter, and "A" indicates an approximation filter.

Figure 7:
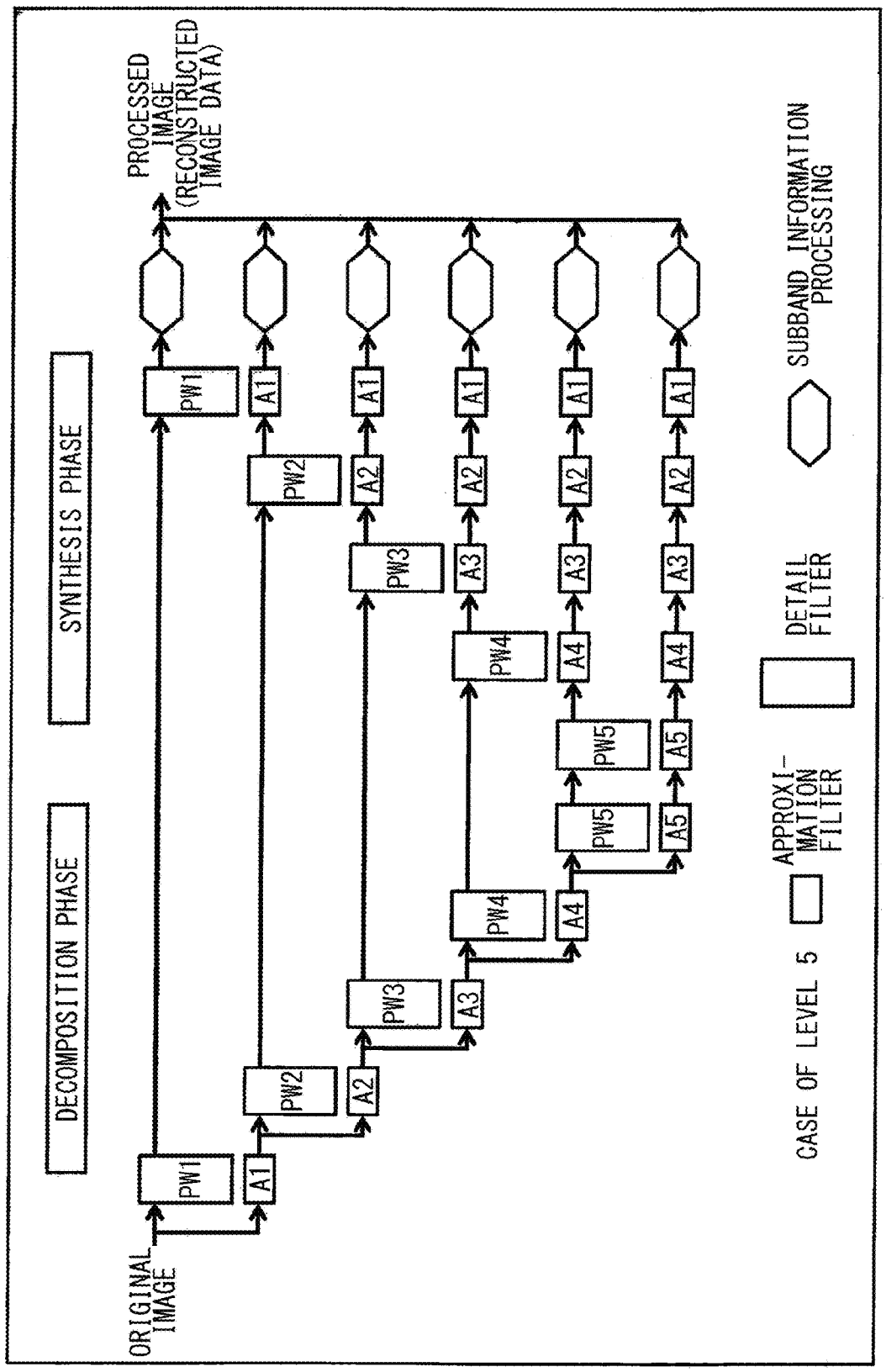
FIG. 7 is a diagram illustrating an exemplary filter bank of maximal overlap multiresolution decomposition.

As illustrated in FIG. 7, first, the decomposition unit 102b decomposes, using a pinwheel framelet at level 1, the original image as an input signal into a decomposition subband signal that passes a detail filter PW1 and a signal that passes one approximation filter A1. Next, the decomposition unit 102b decomposes, using a pinwheel framelet at level 2, the signal that has passed the approximation filter A1 at level 1 into a decomposition subband signal that passes a detail filter PW2 at level 2 and a signal that passes an approximation filter A2 at level 2. Then, the decomposition unit 102b applies the signal obtained in the decomposition phase to the filter bank in the synthesis phase, and ultimately obtains synthesis subband signals of 99×5 (detail part) and one synthesis subband signal (approximate part).

That is, as illustrated in FIG. 7, the weighting unit 102d of the reconstruction unit 102c performs coefficient processing on the synthesis subband signals corresponding to at least one of a plurality of filters in the filter bank, attenuates the subband signals corresponding to the approximation filter and the detail filter away from the approximation filter, and amplifies the subband signals corresponding to the detail filter close to the approximation filter, thereby generating the edge-induced visual illusion image (step S-2).

Then, the processed image output unit 102g obtains the processed image data of the edge-induced visual illusion having been subject to various kinds of processing such as weighting in step S-2 (step S-3).

An example of the basic processing in the case of using the multiresolution decomposition according to the present embodiment has been described. According to the present embodiment, an edge-induced visual illusion capable of being applied to arbitrary images can be automatically generated without complicated work. According to the present embodiment, a digital filter for making stepwise difference of an edge is devised, and an edge-induced visual illusion can be automatically generated from complex and diverse images.

According to the present embodiment, in addition to the edge-induced visual illusion image having the publicly known Craik-O'Brien-Cornsweet effect or the sumi painting effect, a new type of the edge-induced visual illusion image can be generated. The present inventors have termed this new type of visual illusion of brightness caused by an edge an "visual illusion caused by a smooth edge". Through the filtering using the digital filter according to the present embodiment, it becomes possible to instantly generate edge-induced visual illusion images even for complex designs and figures. Since it is generated by the filtering using the digital filter, the original image is not necessarily in the vector format in which an edge is easily operated but can be in the raster format, whereby the original image can be flexibly set such as using existing images as original images.

Further, since the type of brightness change of the edge is different between the "visual illusion caused by a smooth edge", the "Craik-O'Brien-Cornsweet effect", and the "sumi painting effect", the impression of the visual illusion image can be changed by using them properly. Furthermore, while the area in which two types of brightness appear to look different is produced according to the Craik-O'Brien-Cornsweet effect and the sumi painting effect, in the present embodiment, it is possible to easily generate, in one image, the area in which a plurality of types of brightness of two or more appears to look different.

According to the present embodiment, it is also possible to generate, in addition to the grayscale visual illusion image, a color visual illusion image in which the brightness appears to look different. It is also possible to generate the watercolor illusion easily. In the case of watercolor illusion as well, the watercolor illusion effect can be exhibited by generating various types of edges. Particularly, according to the present embodiment, the watercolor illusion using a smooth edge can be generated. The watercolor illusion using a smooth edge has not been publicly known, and is generated according to the present embodiment for the first time. The present inventors has termed it a "watercolor illusion with a smooth edge". It becomes possible to perform image processing regarding contrast using the present generation technique of the visual illusion caused by a smooth edge.

According to the present embodiment, it becomes possible to generate the edge-induced visual illusion from various images, and images devised by a designer and existing images can be made into edge-induced visual illusion images. Since the visual illusion effect tends to attract people's attention, it becomes possible to produce posters and brochures with high advertising effect. In the art field, art works utilizing the existing visual illusion have been usually produced in the conventional op art. According to the present embodiment, it becomes possible to produce new visual illusion images suitable for respective works, which will be one of new techniques for the op art. It can also be used to produce a visual illusion image for a postcard, a fan, a plastic sleeve, wrapping paper, and packaging of products. Furthermore, the technique according to the present embodiment can be applied to image processing regarding contrast, which may be applied to a copier, a projector, and the like.

Example of Edge-Induced Visual Illusion Generation Process

Next, examples of an edge-induced visual illusion generation process performed by the edge-induced visual illusion generation apparatus 100 will be described below. In the following examples, although it is assumed that a part of the filter bank having a multiresolution structure (indicating a maximal overlap multiresolution structure or a multiresolution structure in which the number of thinning is changed depending on levels) is used as a two-dimensional digital filter, the present invention is not limited thereto, and the edge-induced visual illusion generation may be performed using a unit impulse response or the like prepared in advance. For example, the processing in which multiresolution decomposition is performed on the original image and appropriate weighting and adding are performed on the synthesis subband signals to obtain a processed image and the processing in which a filter is generated in advance using a unit impulse response to obtain a processed image using the cyclic convolution product of the unit impulse response and the original image lead to the same result, whereby either method can be used.

More specifically, an array of zero with the number of images same as the original image is generated, and set it as a unit impulse with only one point on the upper left being set to one. This is subject to maximal overlap multiresolution decomposition up to an appropriate level using a pinwheel framelet of degree 7, for example. The obtained synthesis subband signals are appropriately weighted and added, thereby obtaining a filter. Appropriate scaling is applied to the output image obtained by performing the cyclic convolution product of the original image and this filter, thereby obtaining a visual illusion image.

Note that, in the following examples, a digital filter generated using a pinwheel framelet of degree 7 and maximal overlap multiresolution decomposition is used unless otherwise stated. However, the method of generating the filter is not limited thereto. The digital filter and the method of generating the same using a pinwheel framelet may be adopted with reference to WO 2013/128781 A. The broad-sense pinwheel framelet is suitable for generating a filter having a filter property necessary for implementing the present embodiment, that is, (1) a filter with no orientation or an even filter with orientation and is (2) a filter that allows a band of a relatively high frequency to pass or a high pass filter.

EXAMPLE 1

Figure 8:
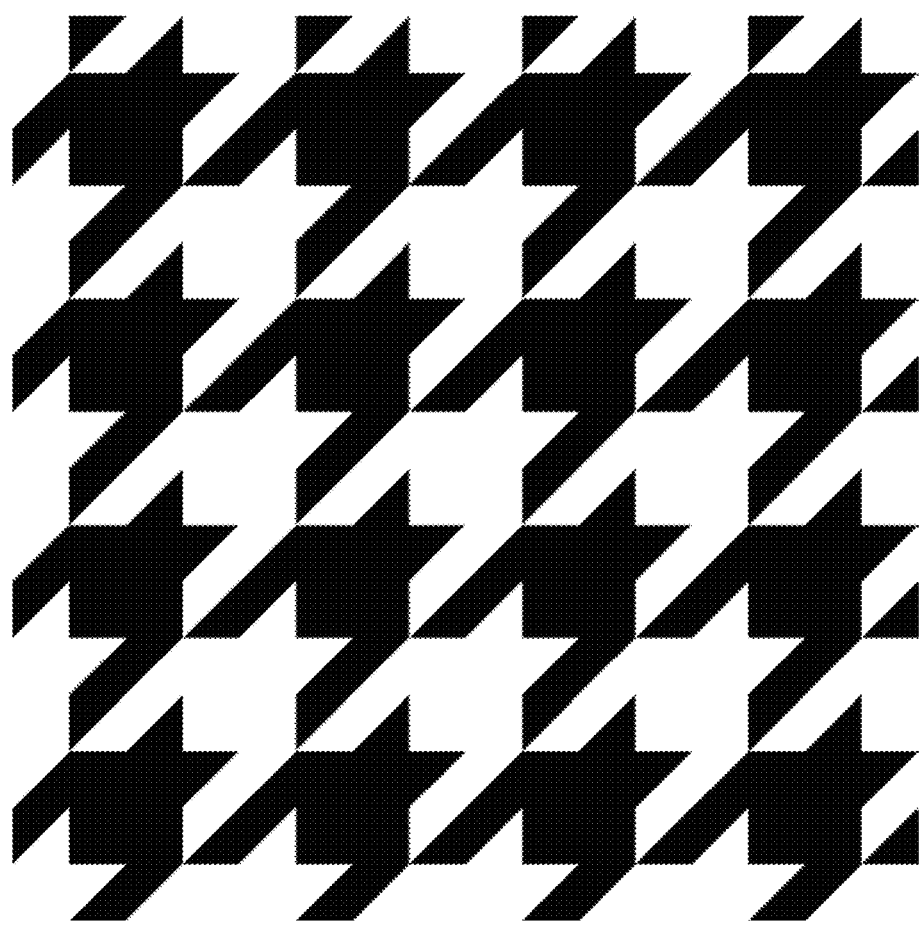
FIG. 8 is a view illustrating an original image of Example 1.

FIG. 8 is a view illustrating an original image of Example 1. A houndstooth check image of two gradations illustrated in FIG. 8 has been used as an original image. FIG. 9 is a chart illustrating weighting of Example 1. Weighting of a filter has been performed as illustrated in FIG. 9. Although a level 1 is not illustrated, it is set to zero for all points. Likewise, in the following descriptions, when there is no notation of a lower level, it indicates that all points in the lower level are set to zero.

Figure 10:
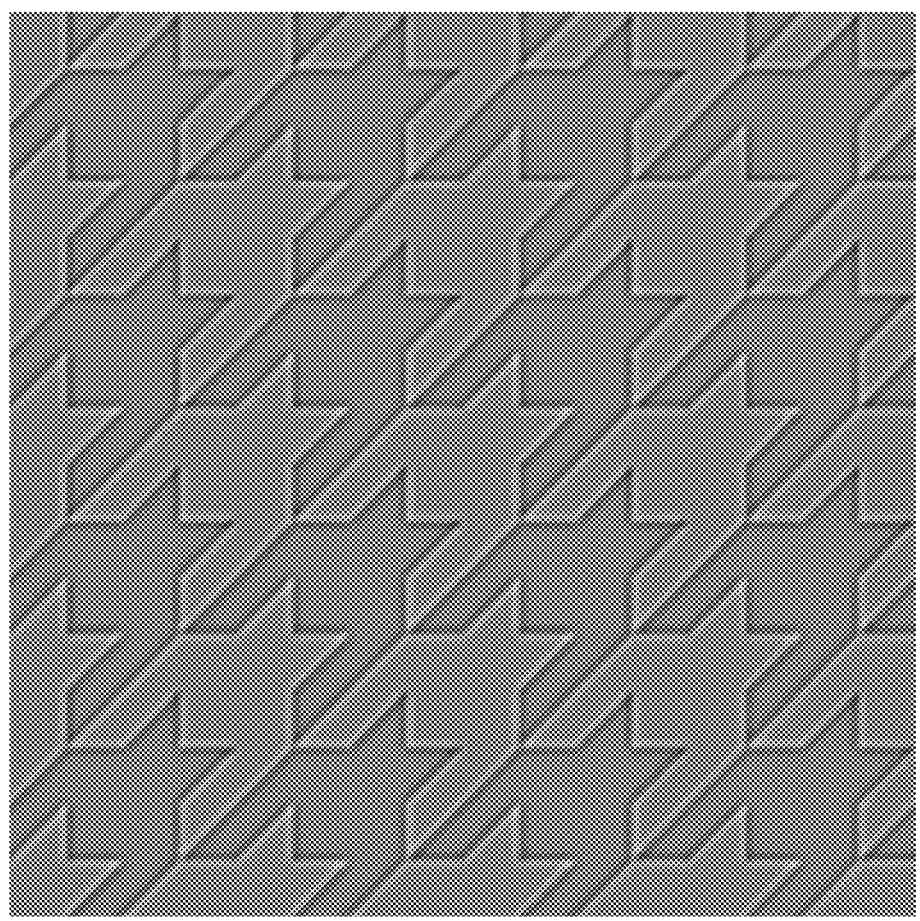
FIG. 10 is a view illustrating an "visual illusion caused by a smooth edge" obtained in Example 1.
Figure 11:
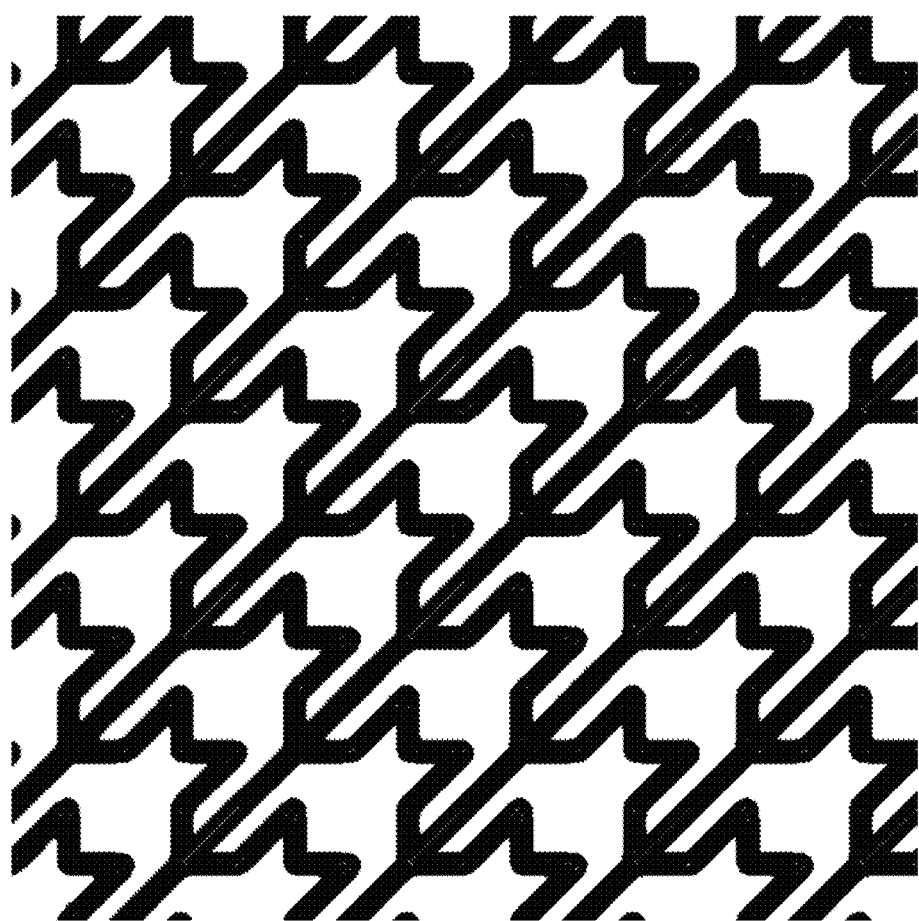
FIG. 11 is a view illustrating the area of the same color in FIG. 10 in white color.

FIG. 10 is a view illustrating an "visual illusion caused by a smooth edge" obtained in Example 1. In FIG. 10, while it appears to include dark gray and light gray, this phenomenon is based on a visual illusion, and portions other than the edge portions are in the same color in reality. FIG. 11 is a view illustrating the area of the same color in FIG. 10 in white color.

Figure 12:
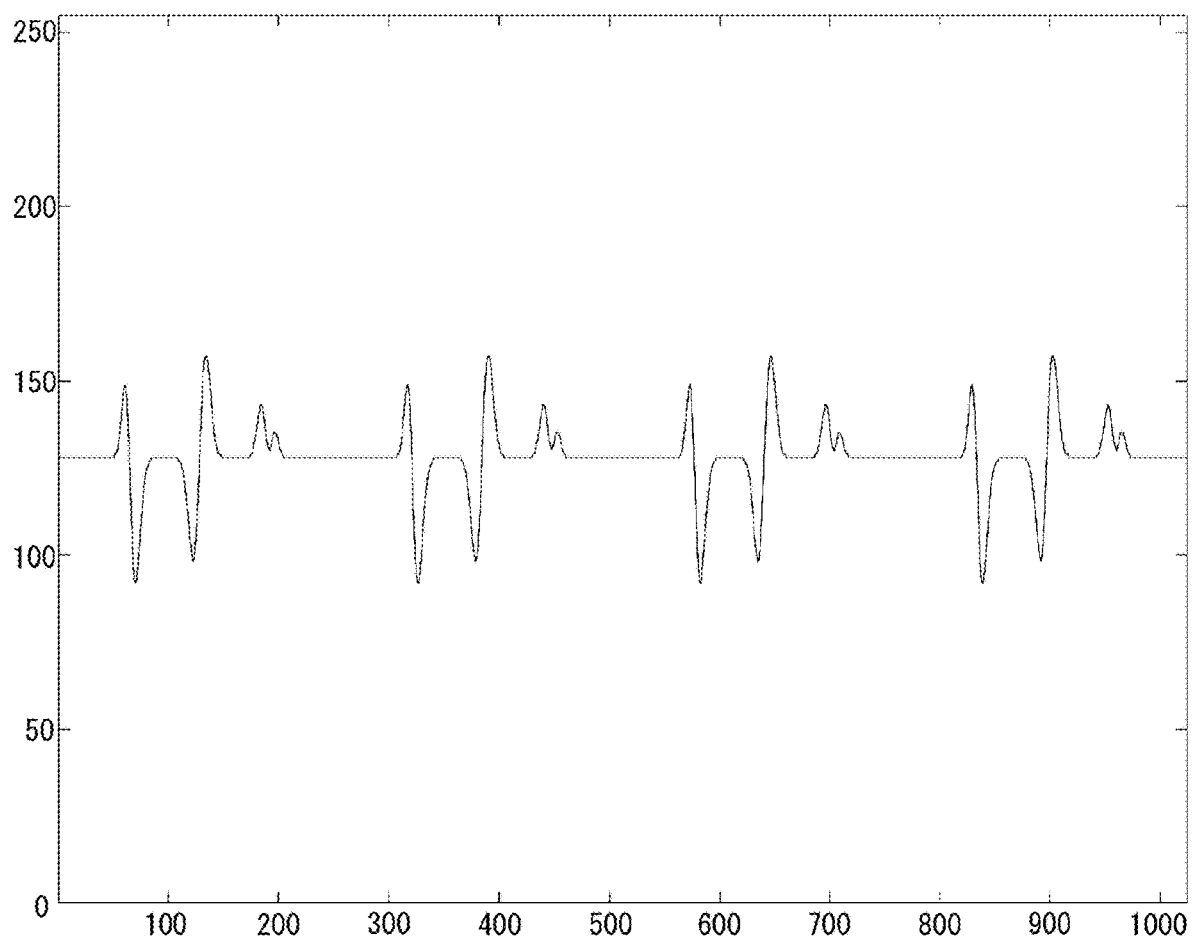
FIG. 12 is a graph illustrating brightness on a horizontal line passing through the center of FIG. 10.

FIG. 12 is a graph illustrating brightness on a horizontal line passing through the center of FIG. 10. As illustrated in FIGS. 11 and 12, it can be seen that the portions other than the edge portions are in the same color. By the weighting illustrated in FIG. 9, the effect of the filter that allows a band of a relatively high frequency with no orientation to pass can be obtained. According to the effect of the filter, at the boundary between the bright area and the dark area in the original image, an edge having a smooth positive value and an adjoining edge having a smooth negative value are generated in the processed image. Besides, the portion with no brightness change in the original image is set to zero in the processed image. When this processed image is scaled such that the value zero becomes the brightness of the ground and the height of the edge becomes suitable for the visual illusion effect, the visual illusion image in FIG. 10 can be obtained. Note that both sides of the edge are smooth. This is a new type of the edge-induced visual illusion different from the Craik-O'Brien-Cornsweet effect and the sumi painting effect.

EXAMPLE 2

In Example 2, a filter different from that in Example 1 is used to generate a visual illusion image having the Craik-O'Brien-Cornsweet effect. FIGS. 13 to 15 are charts illustrating weighting of the filter used in Example 2. By the weighting, the effect of a high pass filter with no orientation can be obtained.

Figure 16:
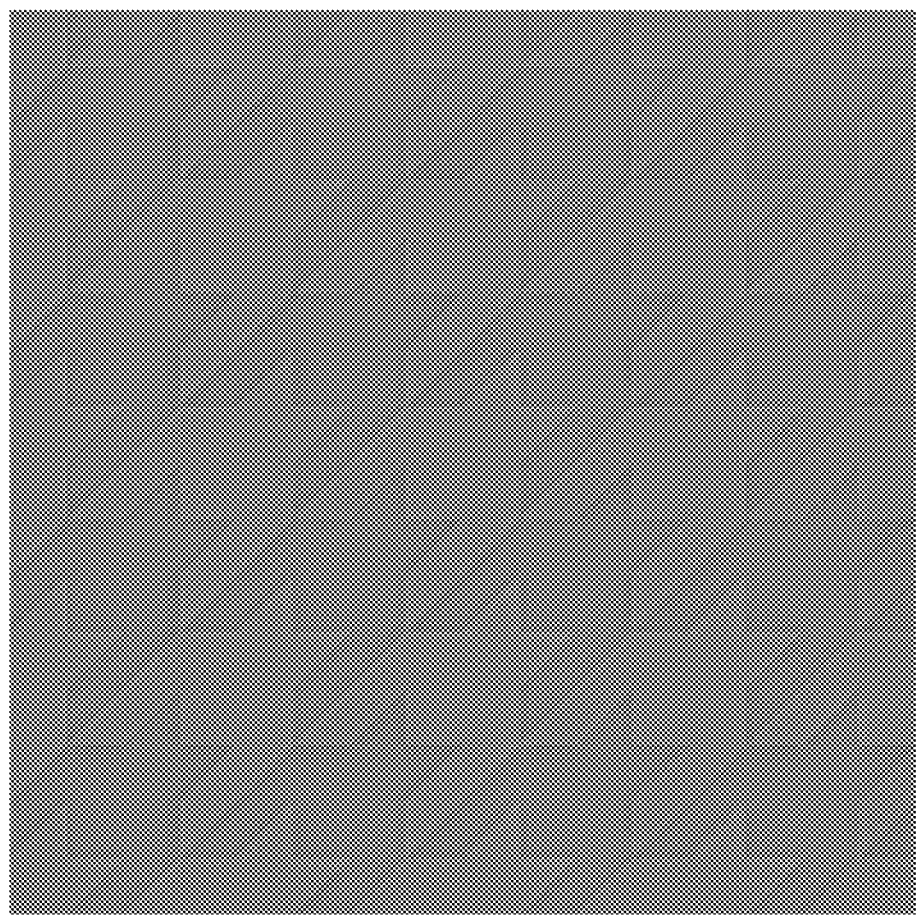
FIG. 16 is a view illustrating a visual illusion image obtained by the weighting in Example 2.
Figure 17:
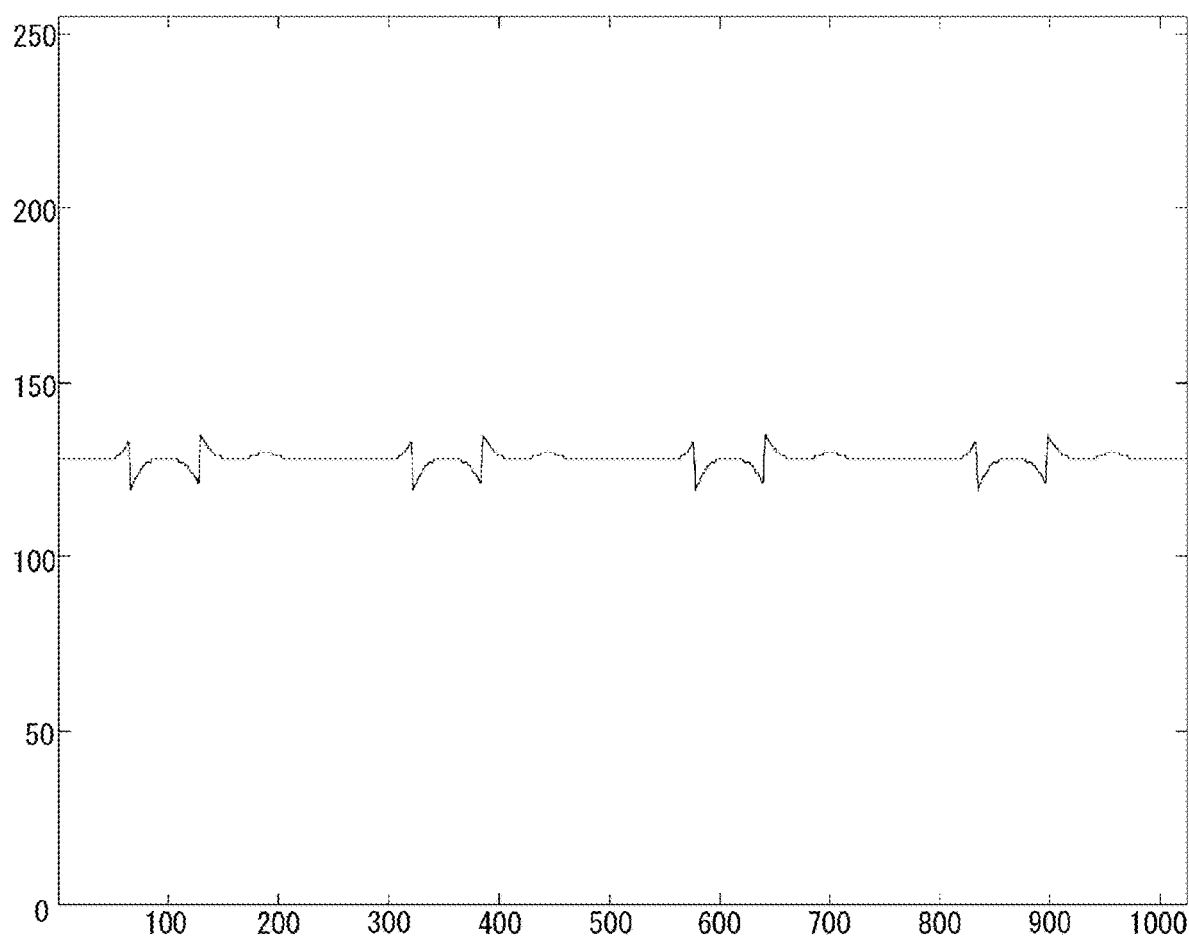
FIG. 17 is a graph illustrating brightness on a horizontal line passing through the center of FIG. 16.

FIG. 16 is a view illustrating a visual illusion image obtained by the weighting in Example 2 and appropriate scaling. FIG. 17 is a graph illustrating brightness on a horizontal line passing through the center. As illustrating in FIG. 17, it has been confirmed that the one side of the edge is smooth, and the Craik-O'Brien-Cornsweet effect is exerted as illustrated in FIG. 16.

EXAMPLE 3

Figure 18:
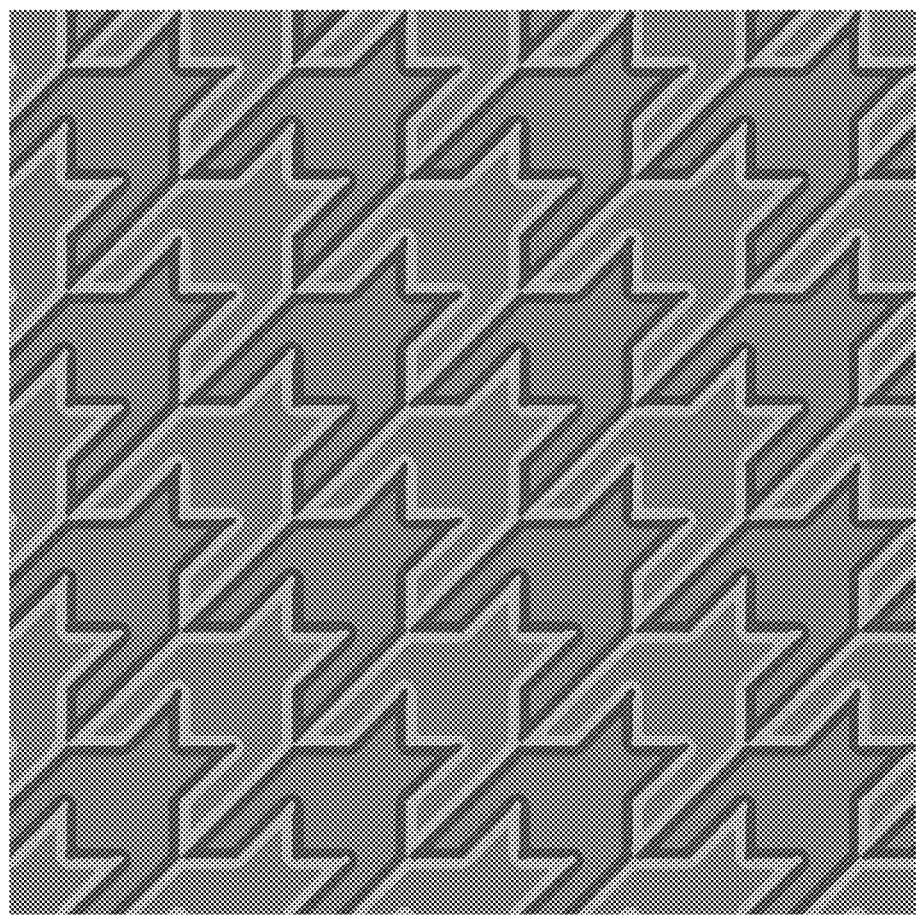
FIG. 18 is a view illustrating a sumi painting effect obtained in Example 3.
Figure 19:
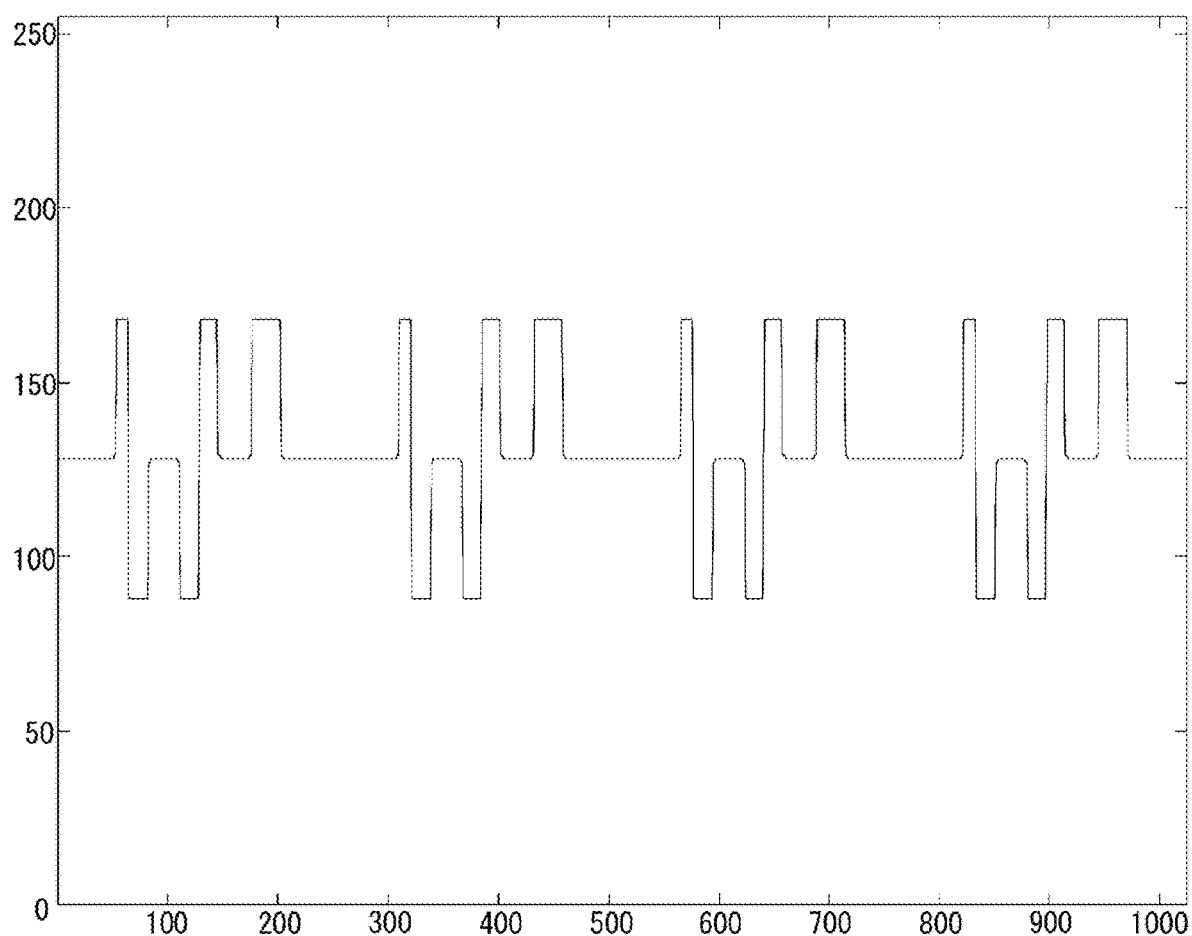
FIG. 19 is a graph illustrating brightness on a horizontal line passing through the center of FIG. 18.

In Example 3, a visual illusion image having the sumi painting effect has been generated from the visual illusion caused by a smooth edge in Example 1. In the visual illusion in Example 1, the value of the area of the same color is 128 of 256 gradations. Here, an appropriate value is represented by $\alpha$. The image of FIG. 18 has been obtained by setting, in the visual illusion image, a value larger than 128 to 128+$\alpha$ and a value less than 128 to 128−$\alpha$ and performing appropriate scaling. FIG. 18 is a view illustrating the sumi painting effect obtained in Example 3. FIG. 19 is a graph illustrating brightness on a horizontal line passing through the center thereof. It can be seen that the edge is rectangular and is a line of uniform brightness.

As in Examples 1 to 3, it has been confirmed that, according to the present embodiment, various edge-induced visual illusion images can be generated such as the Craik-O'Brien-Cornsweet effect and the sumi painting effect in addition to the visual illusion caused by a smooth edge.

EXAMPLE 4

Figure 20:
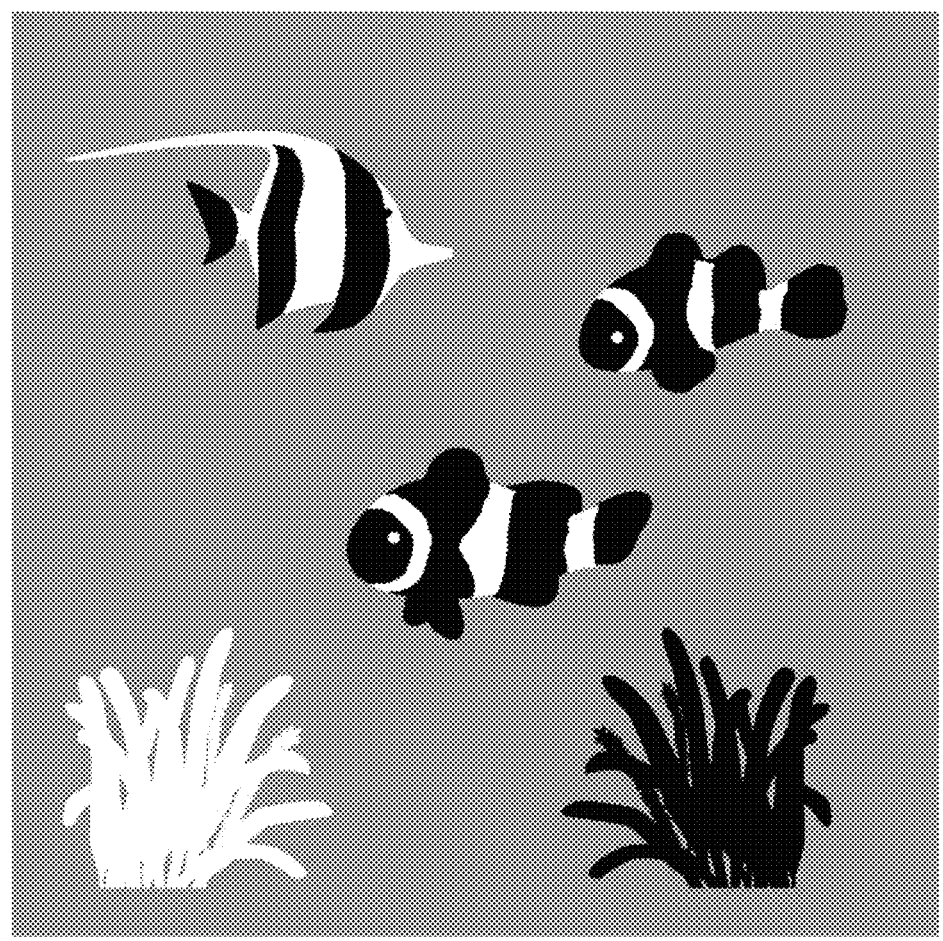
FIG. 20 is an original image of Example 4 in which three types of brightness are included in the original image.
Figure 22:
FIG. 22 is a visual illusion image obtained from the original image of FIG. 20 in Example 4.

In Example 4, an example of the visual illusion image among the visual illusion caused by a smooth edge having an area in which three types of brightness appear to look different and the visual illusion image having an area in which four types of brightness appear to look different will be demonstrated. Note that the visual illusion image is color in this example. FIG. 20 is a first original image of Example 4 in which three types of brightness are included in the original image. FIG. 21 is a chart illustrating weighting used in processing performed on FIG. 20 in Example 4. FIG. 22 is a visual illusion image obtained from the original image of FIG. 20 in Example 4.

In FIG. 22, for example, while the background, the bright band of the fish stripes, and the dark band appear to look different colors, they are the same color in reality. Here, the original image is used for L* of CIE L*a*b*, a* and b* are set to have constant values, and only L* is processed, thereby generating a visual illusion caused by the color smooth edge.

Figure 23:
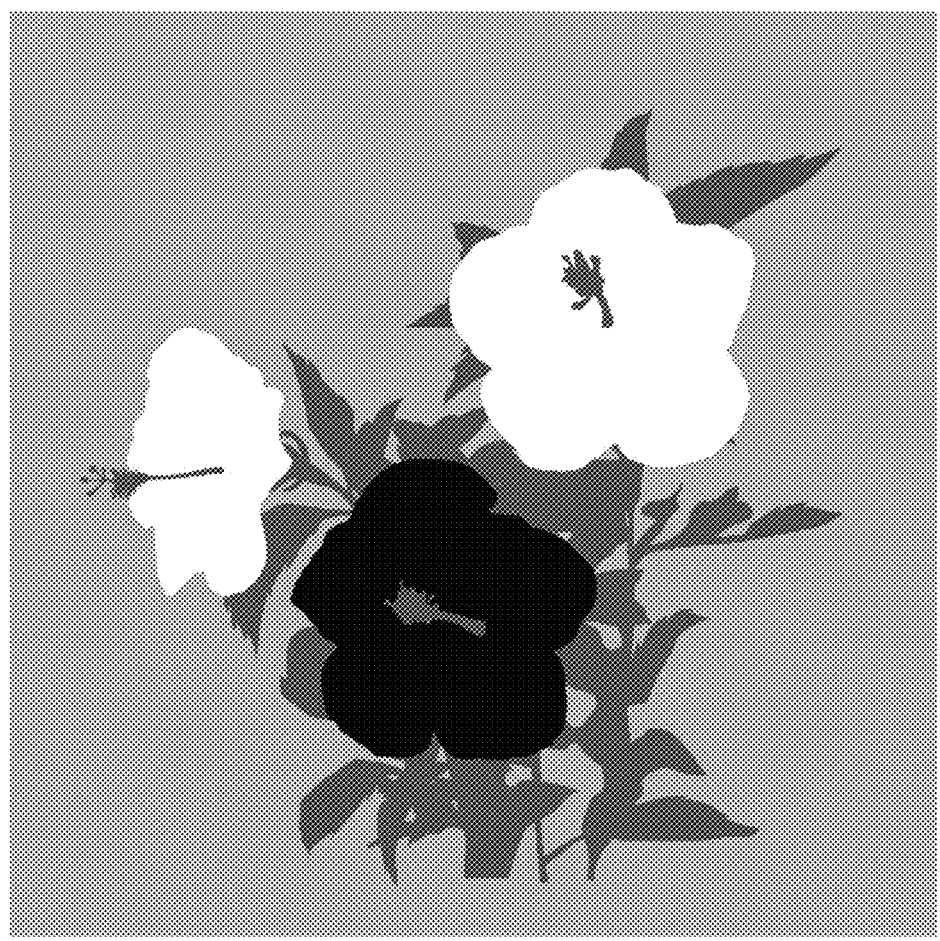
FIG. 23 is a view illustrating an original image having four different types of brightness in Example 4.
Figure 25:
FIG. 25 is a view illustrating a visual illusion image obtained from the original image having four types of brightness in Example 4.

Likewise, FIG. 23 is a second original image of Example 4 in which four types of brightness are included in the original image. FIG. 24 is a chart illustrating weighting used in processing performed on FIG. 23 in Example 4. FIG. 25 is a view illustrating a visual illusion image obtained from the original image having four types of brightness in Example 4.

In FIG. 25, for example, while it appears to look that the background, the bright flower, the dark flower, and the leaf are illustrated in different four types of brightness, they are the same color in reality.

In this manner, according to the present invention, it becomes possible to automatically generate the visual illusion image having the area in which a plurality of types of brightness appears to look different even though the brightness is the same in reality. This is because, due to the filter effect according to the present invention, a high edge is generated in the processed image at the position where the brightness difference is large in the original image, and a low edge is generated at the position where the difference is small. Note that, in Example 4, different levels of filters have been used for the two original images. Effective visual illusion images can be generated by changing the filter according to the characteristics of the original image such as the fineness.

Generation of Watercolor Illusion

Here, as another visual illusion in which a color of the area surrounded by a line appears to look different from the actual color, the watercolor illusion has been known (see Non-patent literatures 6 and 7). The watercolor illusion is a visual illusion in which the area surrounded by adjacent bright-colored line and dark-colored line appears to look thinly colored with the color of the inner line. It is known that the visual illusion is higher when the shape of the line is wavy rather than the case of a straight line, and the visual illusion effect is high when the bright line is inside and the ground color is white. It is disclosed in Non-patent literature 6 that the visual illusion occurs even in the case of a dotted line.

Since it is necessary to draw wavy lines of two colors, it is disclosed in Non-patent literature 1 that technical skill is required to draw a watercolor illusion figure. However, with the embodiment according to the present invention being used, a watercolor illusion including complex lines can be generated. Moreover, according to the present invention, a watercolor illusion with a smooth edge and a watercolor illusion with a edge of the type of the Craik-O'Brien-Cornsweet effect can also be generated.

The filter and the method of filtering are similar to that of the "visual illusion caused by a smooth edge". Further, after the edge is generated by this filtering, the edge is colored and the ground is made white. The original image may be a color image, or may use the grayscale and an arbitrary color is added after the edge is generated. Examples will be described below.

EXAMPLE 5

Figure 26:
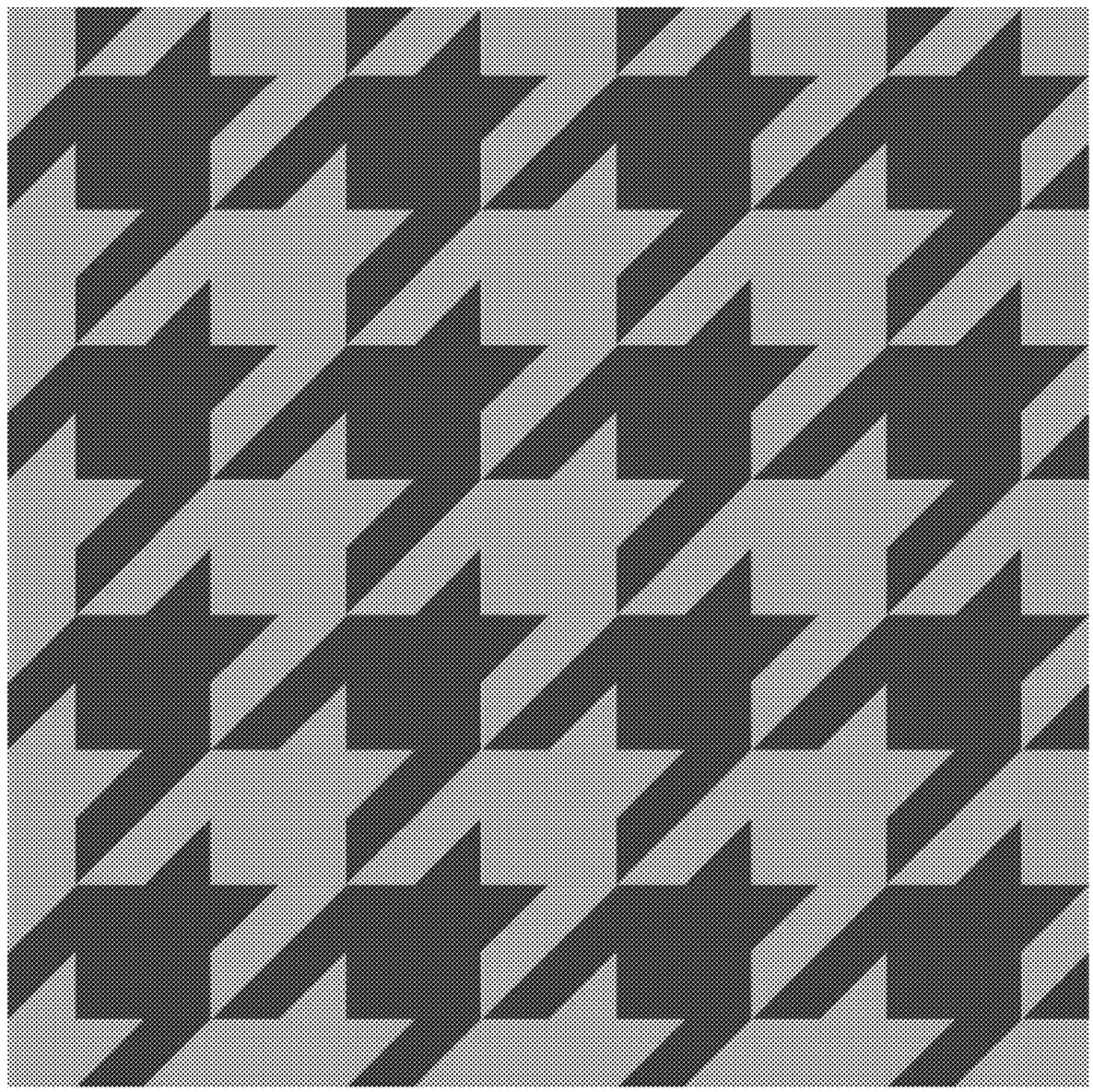
FIG. 26 is a view illustrating an original image of Example 5.
Figure 27:
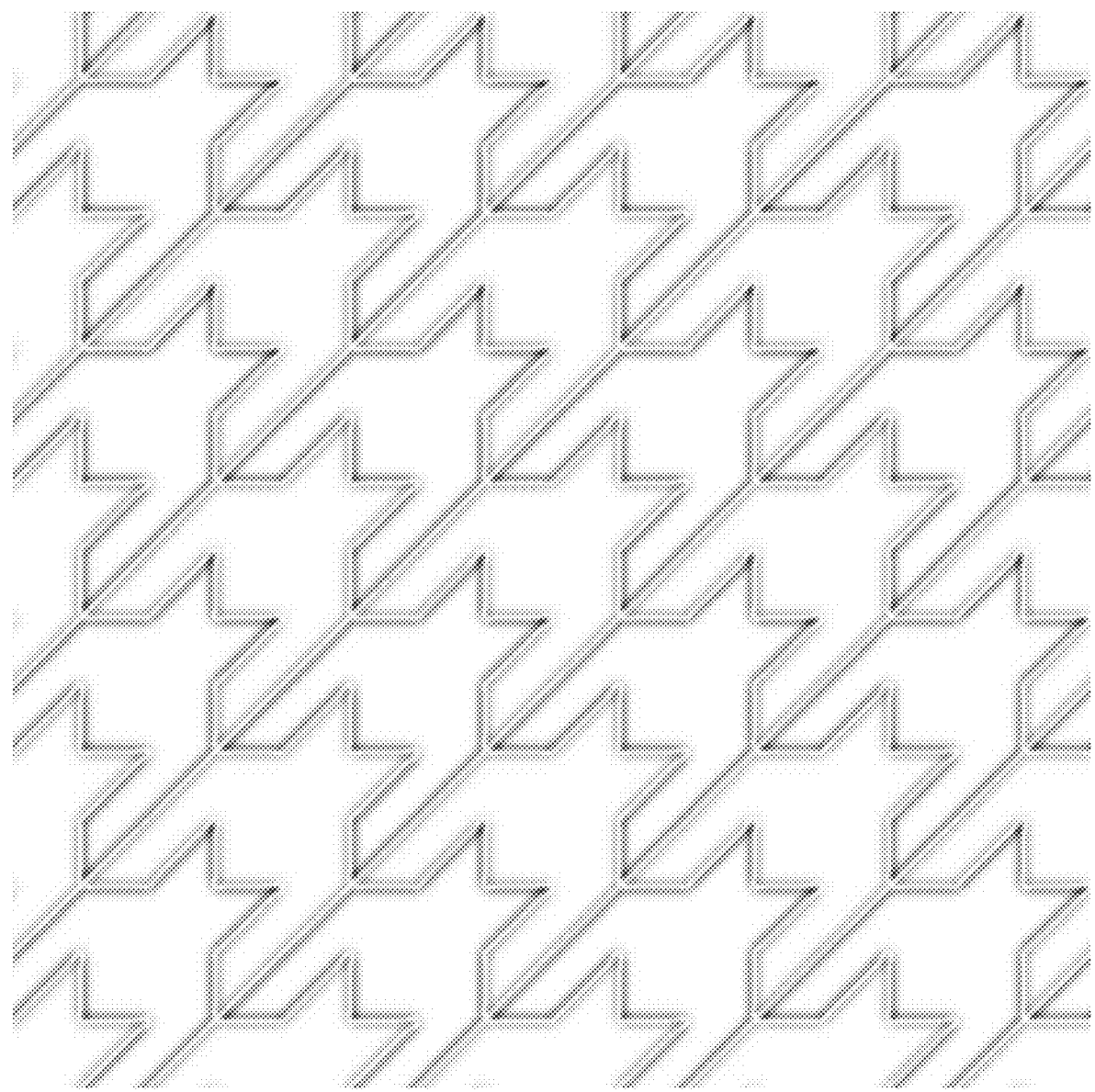
FIG. 27 is a watercolor illusion with a smooth edge with FIG. 26 serving as the original image.

FIG. 26 is a view illustrating an original image of Example 5, and FIG. 27 is a watercolor illusion with a smooth edge with FIG. 26 serving as the original image. As illustrated in FIG. 27, it is white in reality other than the edge portions, the area surrounded by orange color causes an illusion of being perceived as light orange color.

FIG. 28 is a chart illustrating weighting of Example 5. Maximal overlap multiresolution decomposition using a pinwheel framelet of degree 7 has been used. In this example, the original image is converted into CIE L*a*b*, and the maximal overlap multiresolution decomposition is performed, thereby obtaining data to be the basis of the visual illusion image. Further, with respect to the data corresponding to L* of the obtained data, a certain type of normalization is performed on each of positive and negative to obtain an absolute value. The value obtained by scaling it is subtracted from 100. This scaling is performed such that the tip of the edge of the visual illusion image is close to the color of the corresponding portion of the original image, whereby the color of the original image is reflected in the visual illusion image. By subtracting the value from 100, the ground becomes white. With respect to a* and b*, although the scaling is performed in a similar manner, the value of the portion with no change is substantially zero, whereby the processing for making the ground white is not necessary.

Figure 29:
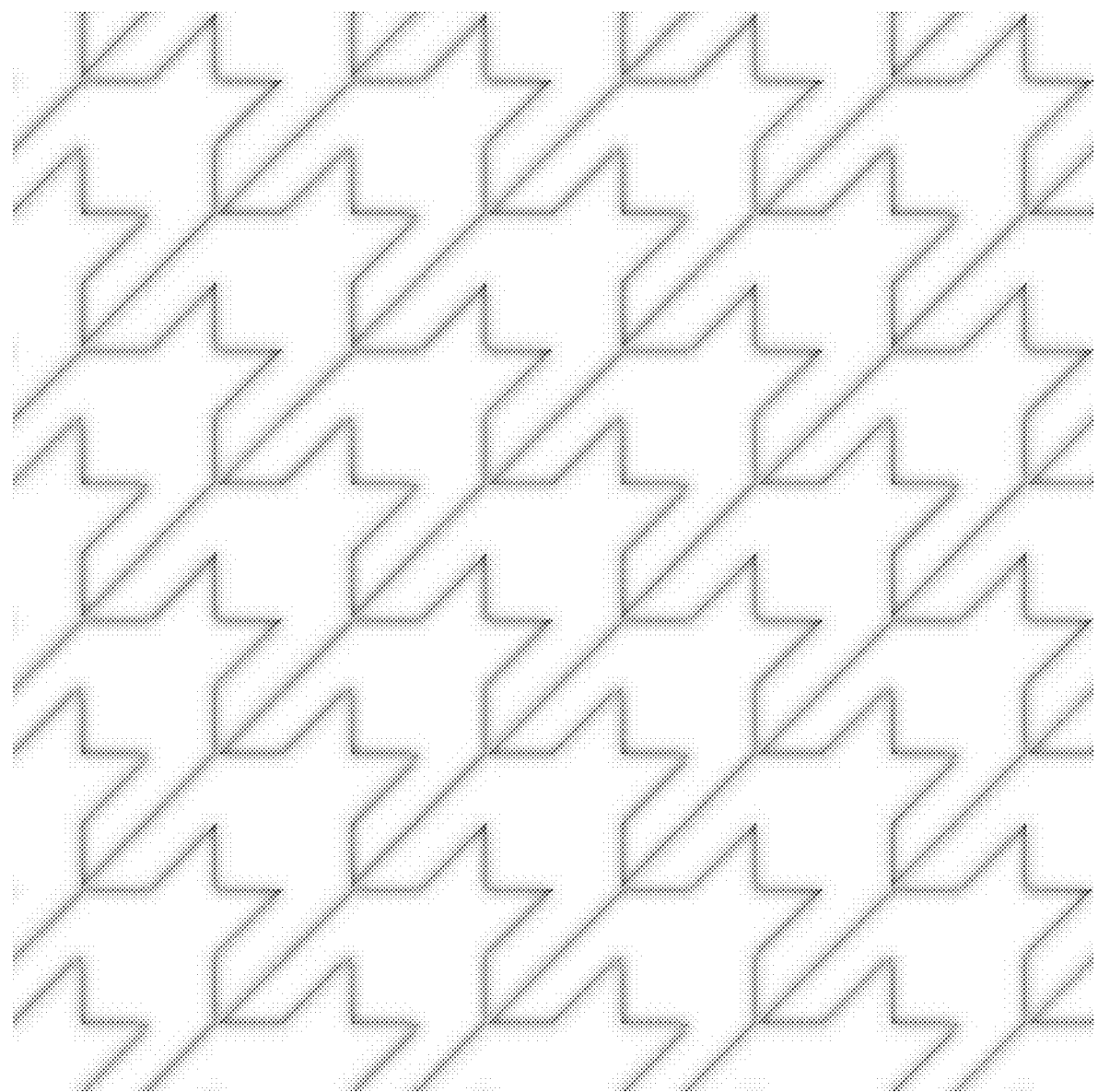
FIG. 29 is a view illustrating a watercolor illusion of an edge of the Craik-O'Brien-Cornsweet effect type with FIG. 26 serving as the original image.
Figure 30:
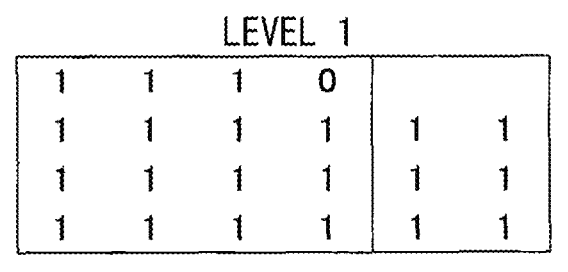
Figure 31:
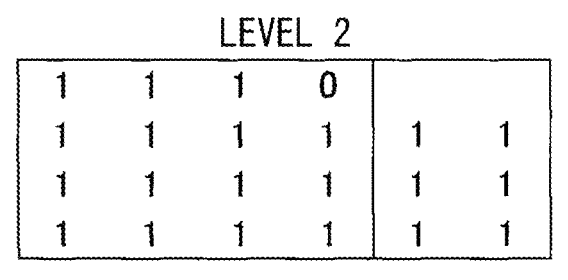

FIG. 29 is a view illustrating the watercolor illusion of the edge of the Craik-O'Brien-Cornsweet effect type with FIG. 26 serving as the original image. FIGS. 30 and 31 are charts illustrating weighting of a filter. Maximal overlap multiresolution decomposition using a pinwheel framelet of degree 3 has been used.

Figure 32:
FIG. 32 is a view illustrating an original image of a complex design including a plurality of colors.
Figure 33:
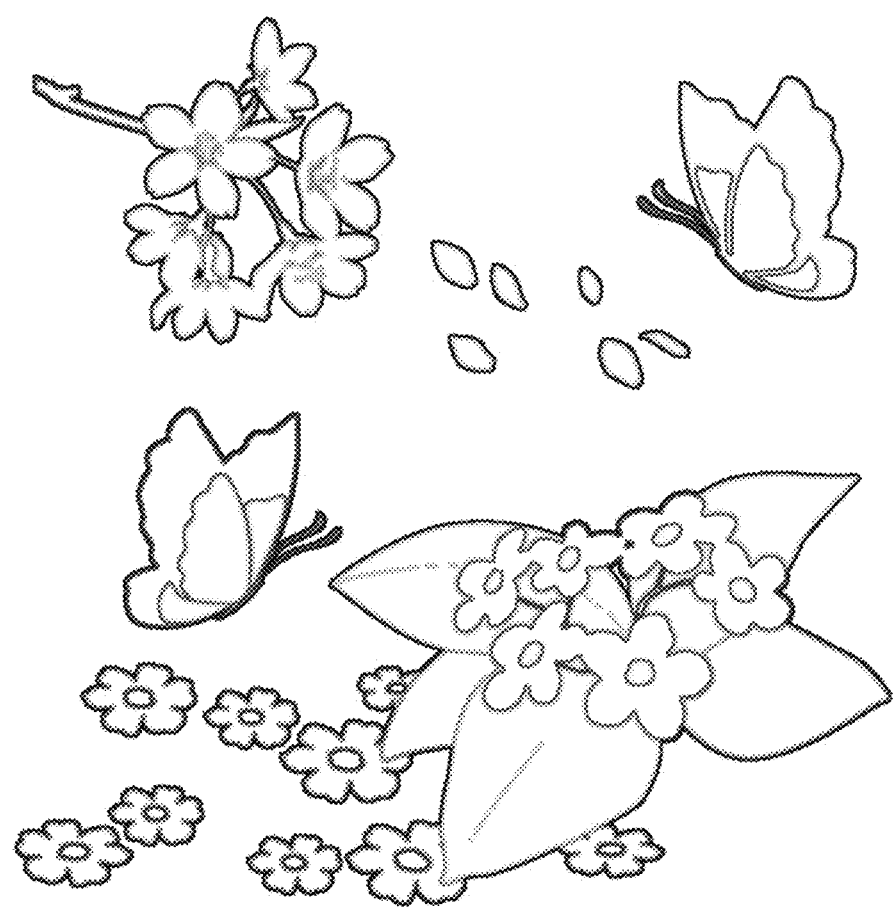
FIG. 33 is a view illustrating a watercolor illusion with FIG. 32 serving as the original image.
Figure 34:
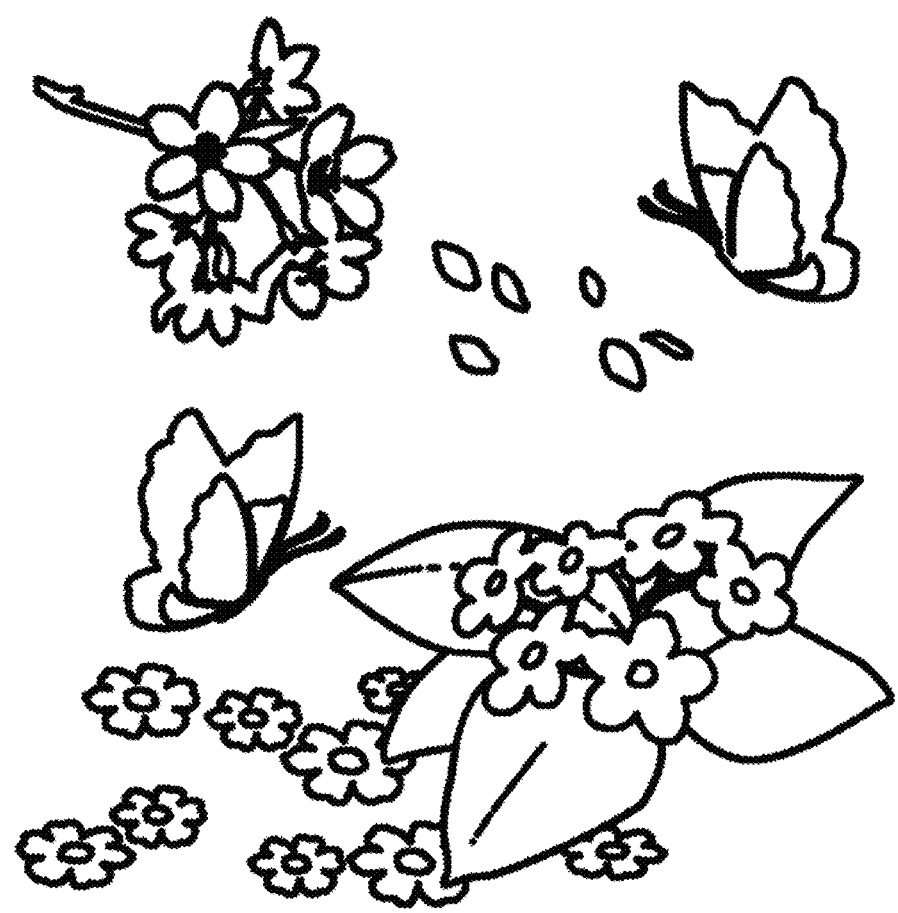
FIG. 34 is a view in which the portions whose color is other than white in FIG. 33 are replaced with black color.
Figure 35:
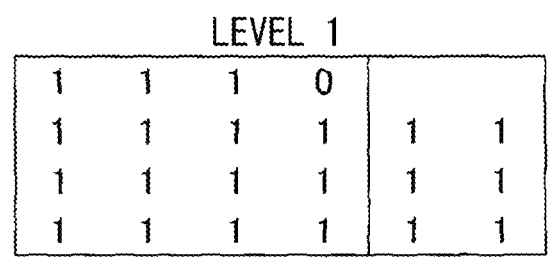

In this Example, it has been confirmed that the watercolor illusion including a plurality of colors, and the watercolor illusion of a complex design can be generated. FIG. 32 is a view illustrating an original image of a complex design including a plurality of colors. FIG. 33 is a view illustrating a watercolor illusion with FIG. 32 serving as the original image. The edge portion generated by filtering is replaced with the color of the original image, and the other portions are replaced with white color, whereby a visual illusion image drawn by a line has been generated. As illustrated in FIG. 33, a visual illusion in which the wings of the butterfly appear to look yellow and the cherry blossoms appear to look pink has occurred. Note that FIG. 34 is a view in which the portions whose color is other than white in FIG. 33 are replaced with black color. In other words, in FIG. 33, the inside portions of the areas where colors are visible are all white. FIG. 35 is a chart illustrating the weighting, and the maximal overlap multiresolution decomposition using the pinwheel framelet of degree 3 has been used.

EXAMPLE 6

As application, by processing an image using a "filter that generates an edge for causing a visual illusion", an image in which contrast appears to be improved can be generated. In Non-patent literature 8, it has been disclosed that an image is processed by a high pass filter to improve the spatial effect and apparent contrast using the Craik-O'Brien-Cornsweet effect. However, since the high pass filter is used in this method, contour emphasis is essential.

Meanwhile, in the image processing according to the embodiment of the present invention, contrast appears to look improved using the "visual illusion caused by a smooth edge". The "visual illusion caused by a smooth edge" uses a filter that allows a band of a relatively high frequency to pass, whereby unnecessary contour emphasis can be suppressed. Further, the portion in which the contour becomes white due to the contour emphasis can also be suppressed.

Figure 36:
FIG. 36 is an original image used in Example 6.
Figure 38:
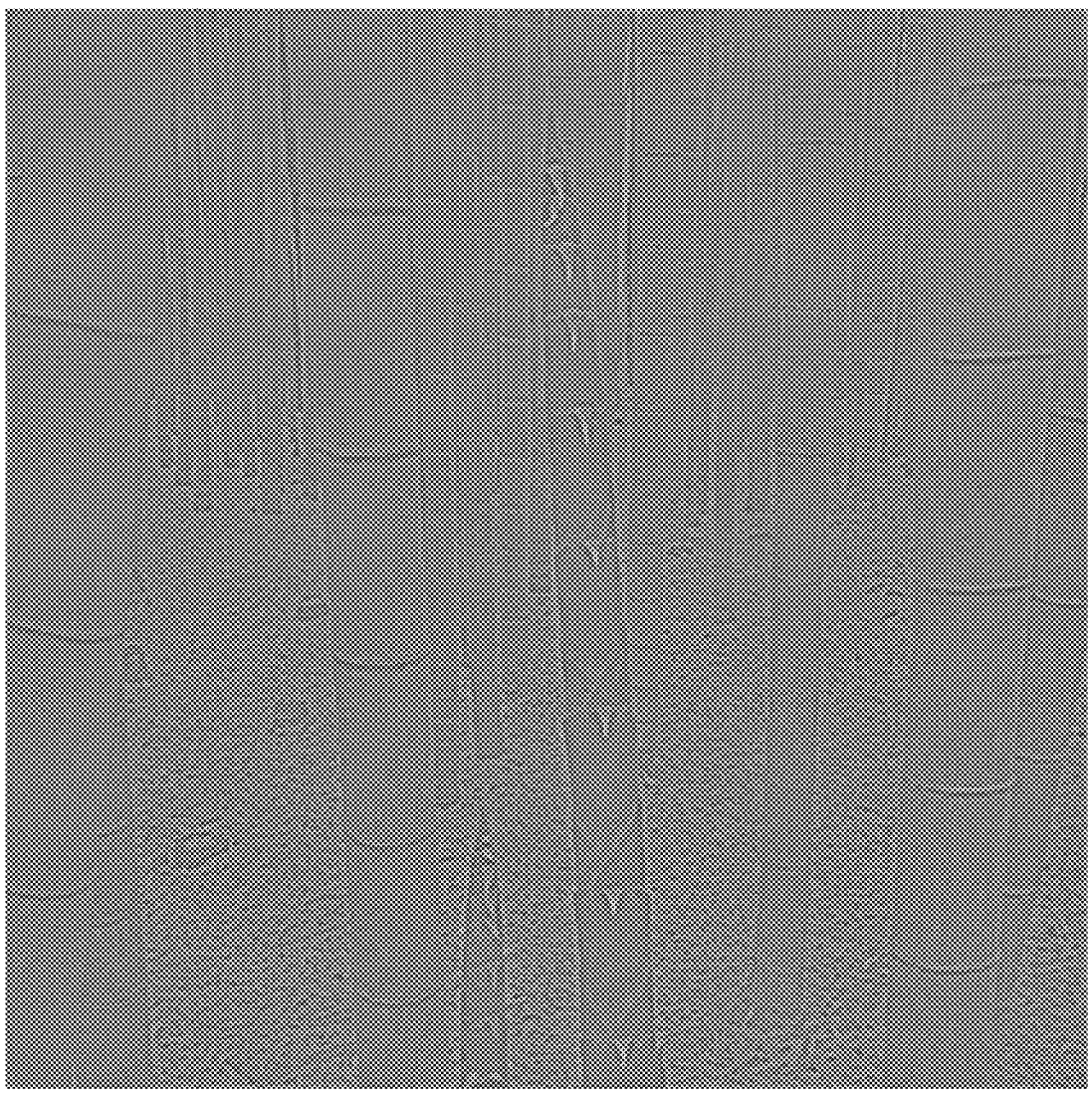
FIG. 38 is a view in which L* of the original image in FIG. 36 is processed using the weighting of FIG. 37, which is scaled and displayed.

In this case, the original image is converted into CIE L*a*b* color space, and L* is processed by a filter that generates a smooth edge. It is appropriately scaled to be added to the original image. Note that the color space to be used is not limited to CIE L*a*b*, and the color component to be processed may be other than brightness. FIG. 36 is an original image used in Example 6, and FIG. 37 is a chart illustrating weighting of a first example of Example 6. FIG. 38 is a view in which L* of the original image in FIG. 36 is processed using the weighting of FIG. 37, which is scaled and displayed.

Figure 39:

FIG. 39 is a view illustrating an image in which FIG. 38 is appropriately scaled and superimposed to L* of the original image in FIG. 36. As illustrated in FIG. 39, it has been confirmed that the contrast appears to look improved and a sense of depth can be perceived more. In FIG. 39, a filter at level 1 is used, whereby the contour is also clear.

Figure 41:
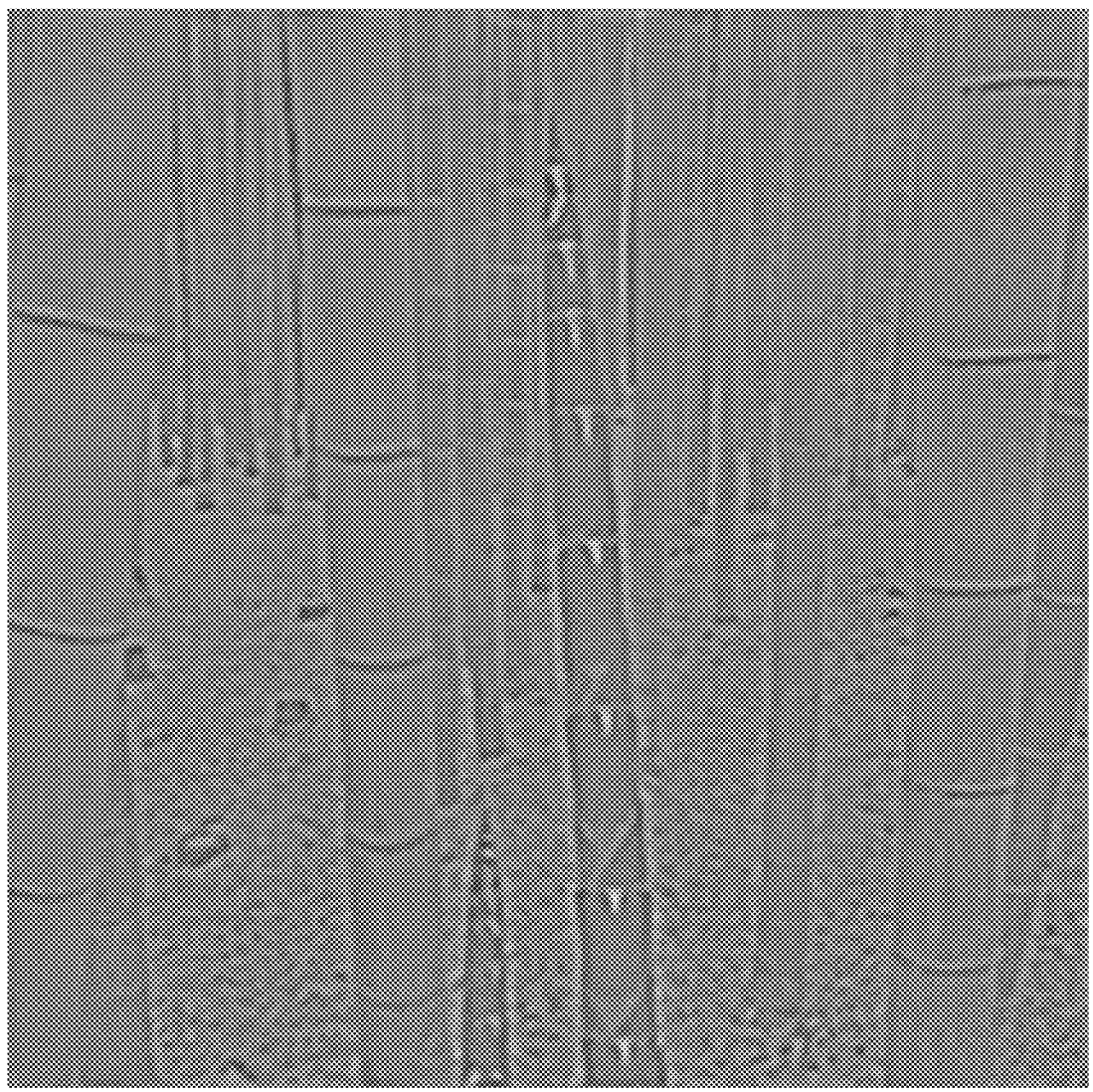
FIG. 41 is a view illustrating an image in which L* of the original image in FIG. 36 is subject to filter processing using the weighting of FIG. 40, which is scaled and displayed.
Figure 42:
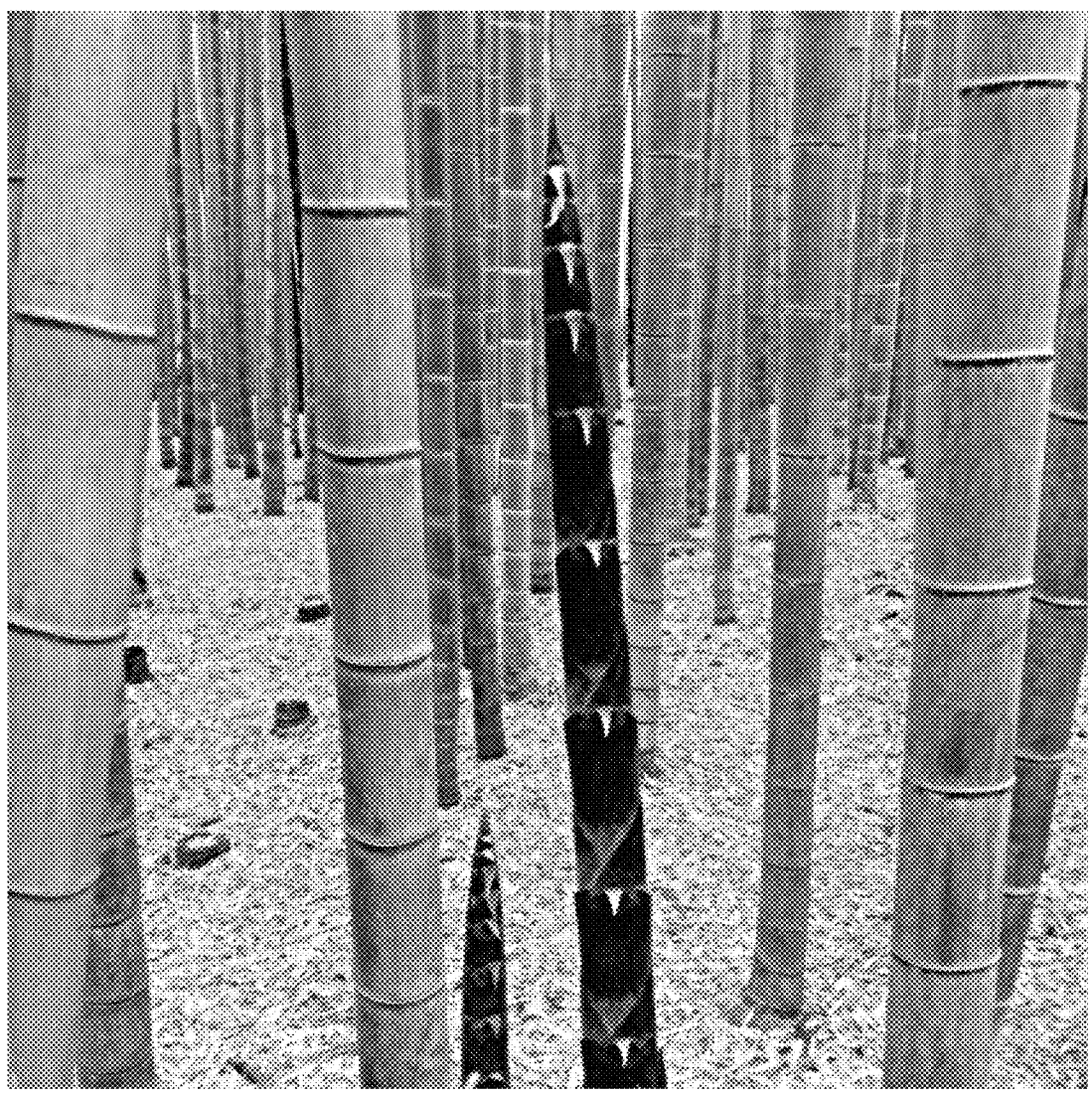
FIG. 42 is a view illustrating an image in which the image in FIG. 41 is appropriately scaled and superimposed to the original image in FIG. 36.

As a next example, a filter at level 2 is used. FIG. 40 is a chart illustrating second weighting of Example 6. FIG. 41 is a view illustrating an image in which L* of the original image in FIG. 36 is subject to filter processing using the weighting of FIG. 40. FIG. 42 is a view illustrating an image in which the image in FIG. 41 is appropriately scaled and superimposed to L* of the original image in FIG. 36.

As illustrated in FIG. 42, the contrast appears to look improved, and a sense of depth can be perceived more. In addition, the contour emphasis is less than that of FIG. 39. In this manner, it has been confirmed that, by selecting a filter according to an intended use, the effect suitable for the intended use can be obtained.

Pinwheel Framelet

The pinwheel framelet used in the present embodiment as an example may be, as described above, a publicly known simple pinwheel framelet, an orientation-selective wavelet frame such as a pinwheel wavelet frame, or a filter bank with orientation selectivity. Hereinafter, a pinwheel framelet will be described.

For the symmetric matrix given by $A=(A_{k,l}):(n+1)\times(n+1)$, a matrix that satisfies $A_{s,t}=A_{n-s,t}=A_{s,n-t}=A_{n-s,n-t}=s$ is determined, where degree n is odd and n≥3, s=0, 1, . . . , [n/2], and t=s, [n/2]. Note that [ ] represents Gauss symbol.

In the case of n=7, the following matrix satisfies the condition.

If the matrix is given by $B=(B_{k,l}):(n+1)\times(n+1)$, it is a matrix that satisfies the following condition (P).

Lemma 2 (H. & S. Arai, 2008). The necessary and sufficient condition for $P_n$ to be a framelet filter related to a rectangular grid, a quincunx grid, or a hexagonal grid is that $B=(B_{k,l})$ satisfies the following condition.

Method of determining $B=(B_{k,l})$ satisfying the above condition $\{(k,l):k=0,1,\ldots,n_0,l=s,\ldots,n_0,\}$ is ordered as follows.

$\mu=(k,l),\nu=(k',l')$

Figure 43:
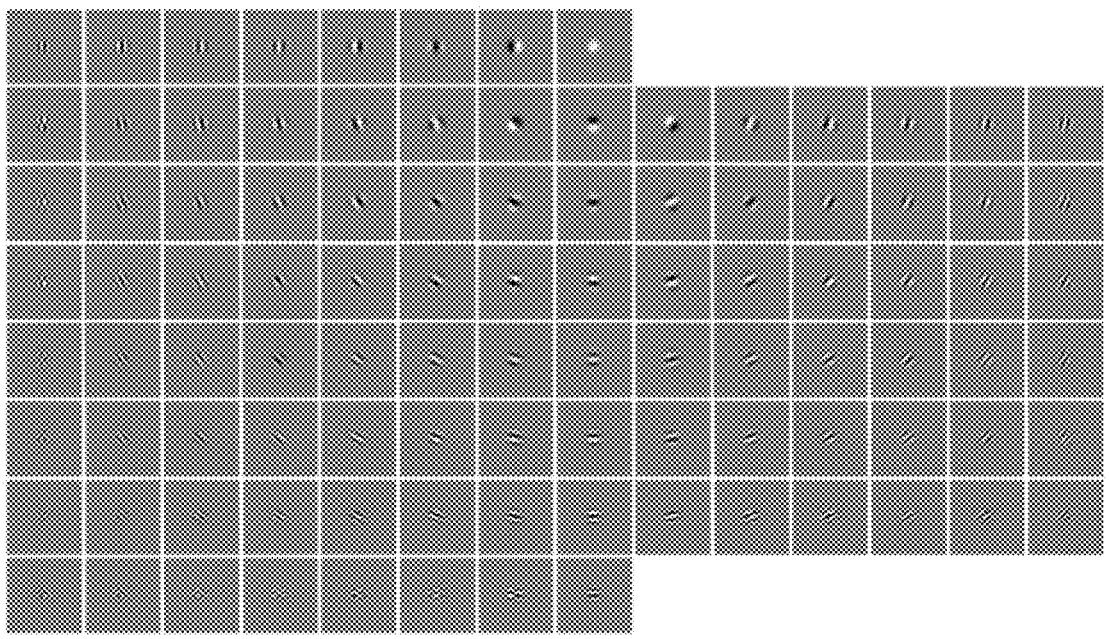
FIG. 43 is a view illustrating filters obtained by calculating the cyclic correlation product of the maximal overlap pinwheel framelet filters at level 2 of degree 7 and the approximation filter at level 1.
Figure 44:
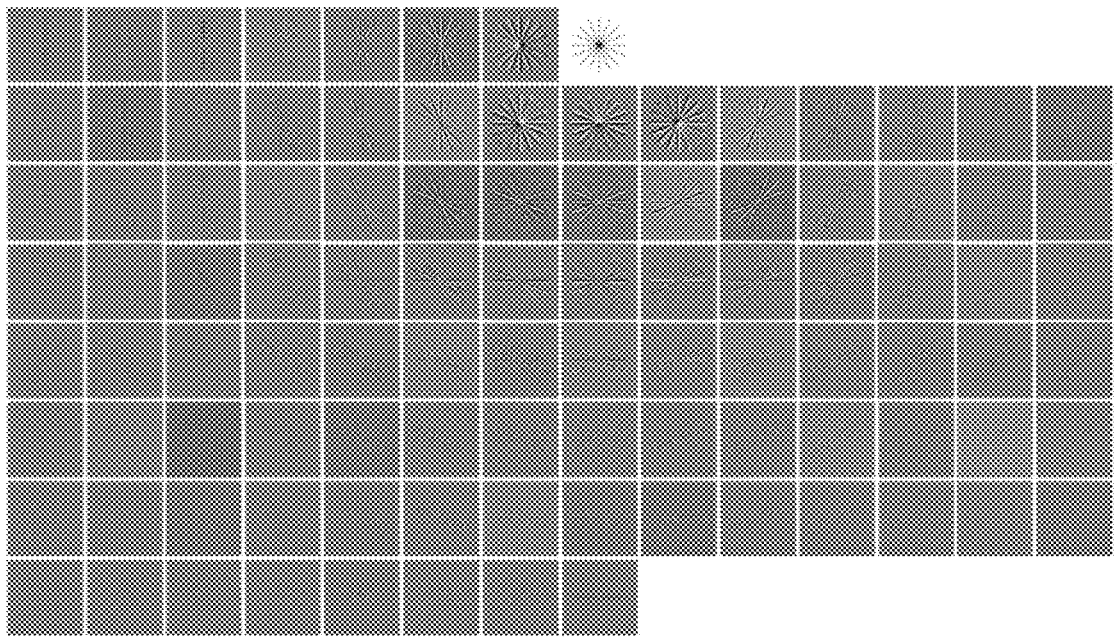
FIG. 44 is a view illustrating respective synthesis subband signals obtained as a result of performing, on a test image, the 2nd stage of the maximal overlap multiresolution analysis (MRA) decomposition by the pinwheel framelet.

Theorem 3 (H. & S. Arai, 2008) $B=(B_{k,1})$ determined above satisfies Lemma 2. Therefore, $P_n$ is a framelet filter related to a rectangular grid, a quincunx grid, or a hexagonal grid. $P_n$ is referred to as a pinwheel framelet of degree n. FIG. 43 is a view illustrating the filters obtained by calculating the cyclic correlation product of the maximal overlap pinwheel framelet filters at level 2 of degree 7 and the approximation filter at level 1. FIG. 44 is a view illustrating respective synthesis subband signals obtained as a result of performing, on a test image, the 2nd stage of the maximal overlap MRA decomposition by the pinwheel framelet.

This is the end of the description of the present embodiment.

As described above in detail, according to the present embodiment, it becomes possible to provide an edge-induced visual illusion generation apparatus, a method of generating an edge-induced visual illusion, a program, a printing medium, and a recording medium that can be applied to an arbitrary image and is capable of automatically generating an edge-induced visual illusion without complicated work. Accordingly, it is highly useful in, in addition to industries that manufacture and sell colored products and the like (such as printing, design, video, and painting industries), service industries that provide services such as videos, and fields of image processing, image analysis, and the like.

Other Embodiments

The embodiment of the present invention has been described above, and the present invention can be implemented by various different embodiments within the scope of the technical idea described in the claims in addition to the embodiment described above.

For example, although the exemplary case where the edge-induced visual illusion generation apparatus 100 performs the processing in the stand-alone mode has been described, the edge-induced visual illusion generation apparatus 100 may perform the processing in response to a request from a client terminal (cabinet different from the edge-induced visual illusion generation apparatus 100) and return the processing result to the client terminal. For example, the edge-induced visual illusion generation apparatus 100 may be configured as an ASP server, receive the original image data transmitted from a user terminal via the network 300, and return the processed image data processed on the basis of the original image data to the user terminal.

Moreover, among the processes described in the embodiment, all or a part of the processes described as automatic processes may be performed manually, and all or a part of the processes described as manual processes may be performed automatically using publicly known methods.

In addition thereto, the processing procedures, the control procedures, the specific names, the information including registered data of each processing and parameters such as retrieval conditions, the screen examples, and the database configurations described in the literature and the drawings above may be arbitrarily modified unless otherwise indicated.

Furthermore, each constituent element of the edge-induced visual illusion generation apparatus 100 illustrated in the drawings is formed on the basis of functional concept, and is not necessarily configured physically the same as those illustrated in the drawings.

For example, all or any part of the processing functions included in each unit of the edge-induced visual illusion generation apparatus 100, and particularly each processing function performed by the controller 102, may be implemented by a central processing unit (CPU) and a program interpreted and executed by the CPU, or may be implemented as hardware using wired logic. Note that the program is recorded in a non-transitory computer-readable recording medium to be described later that includes programmed instructions for causing the computer to execute the method according to the present invention, and is mechanically read into the edge-induced visual illusion generation apparatus 100 as necessary. That is, in the storage 106 such as a ROM and a hard disk drive (HDD), a computer program that provides instructions to the CPU in cooperation with the operating system (OS) and performs various kinds of processing is recorded. This computer program is executed by being loaded into a RAM, and configures the controller in cooperation with the CPU.

Further, this computer program may be stored in an application program server connected to the edge-induced visual illusion generation apparatus 100 via the arbitrary network 300, and all or a part thereof may be downloaded as necessary.

Furthermore, the program according to the present invention may be stored in a non-transitory computer-readable recording medium, or may be configured as a program product. The "recording medium" here includes any "portable physical medium", such as a memory card, a USB memory, an SD card, a flexible disk, a magneto-optical disk, a ROM, an EPROM, an EEPROM, a CD-ROM, an MO, a DVD, and a Blu-ray (registered trademark) disc.

Moreover, the "program" refers to a data processing method written in any language and any description method, and is not limited to a specific format, such as source codes and binary codes. Note that the "program" is not necessarily configured unitarily, and includes a program constituted in a dispersed manner as a plurality of modules and libraries and a program that implements its function in cooperation with a different program represented by an operating system (OS). Note that publicly known configurations and procedures can be used for specific configurations and reading procedures for reading a recording medium, installation procedures after reading, and the like in each device described in the embodiment.

Various databases and the like (filter file 106a and image data file 106b) stored in the storage 106 are a storage means, examples of which include a memory device such as a RAM and a ROM, a fixed disk drive such as a hard disk, a flexible disk, and an optical disk, and store various programs, tables, databases, files for web pages, and the like used for various kinds of processing or providing websites.

Moreover, the edge-induced visual illusion generation apparatus 100 may be configured as an information processing apparatus such as well-known personal computer and workstation, or may be configured by connecting an arbitrary peripheral device to the information processing apparatus. Moreover, the edge-induced visual illusion generation apparatus 100 may be achieved by installing software (including program, data, etc.) that causes the information processing apparatus to implement the method of the present invention.

Furthermore, a specific form of device distribution/integration is not limited to those illustrated in the drawings, and all or a part thereof can be configured by functionally or physically distributing or integrating them in any desired units according to, for example, various additions, or according to functional loads. In other words, the embodiments described above may be implemented by combining them in any desired manner, or the embodiments may be selectively carried out.

What is claimed is:

1. An edge-induced visual illusion generation apparatus, comprising at least:

a storage; and a controller, wherein the storage includes:

a filter storage structured to store a two-dimensional digital filter that is a filter with no orientation or an even filter with orientation and is a filter that allows a band of a relatively high frequency to pass, or is a wavelet frame with orientation selectivity or a filter bank with orientation selectivity that are a set of an approximation filter with no orientation and a plurality of detail filters with respective orientations; and an image data storage structured to store image data, and the controller generates an edge-induced visual illusion image by:

applying the two-dimensional digital filter to the image data to extract a component of a relatively high frequency band, and/or by applying the two-dimensional digital filter to the image data and extracting a component of a relatively high frequency band to apply coloring to an edge of the extracted band component, generating an edge having a smooth positive value and an adjoining edge having a smooth negative value at a boundary between a bright area and a dark area in the image data, setting a portion with no brightness change in the image data to zero in a processed image, and scaling the processed image such that a value zero becomes a brightness of a ground and a height of the edge having a smooth positive value and the edge having a smooth negative value becomes suitable for an optical illusion effect.

2. The edge-induced visual illusion generation apparatus according to claim 1, wherein
the controller performs multiresolution decomposition on the image data using the two-dimensional digital filter.

3. The edge-induced visual illusion generation apparatus according to claim 1, wherein
the filter storage stores a unit impulse response in which the two-dimensional digital filter is applied in advance to a unit impulse signal of an image size same as a size of the image data.

4. The edge-induced visual illusion generation apparatus according to claim 1, wherein
the filter storage stores a pinwheel wavelet frame or a broad-sense pinwheel framelet having a degree that are a set of an approximation filter with no orientation and a plurality of detail filters with respective orientations.

5. The edge-induced visual illusion generation apparatus according to claim 4, wherein
the controller generates the edge-induced visual illusion image by relatively attenuating a subband signal corresponding to the approximation filter and the detail filter of a high degree and relatively amplifying a subband signal corresponding to the detail filter of a low degree.

6. The edge-induced visual illusion generation apparatus according to claim 1, wherein
the controller generates the edge-induced visual illusion image by replacing an edge including the component of a relatively high frequency band with a uniform value for each edge.

7. The edge-induced visual illusion generation apparatus according to claim 1, wherein
the controller applies coloring to the edge of the extracted band component, and sets a color of a ground other than the edge to a predetermined color.

8. The edge-induced visual illusion generation apparatus according to claim 1, wherein
the edge-induced visual illusion image is generated for the purpose of improving contrast.

9. The edge-induced visual illusion generation apparatus according to claim 8, wherein
the controller appropriately scales gradation of the generated edge-induced visual illusion image, and then superimposes the edge-induced visual illusion image to the original image data for the purpose of improving contrast.

10. A method of generating an edge-induced visual illusion to be executed in a computer including at least a storage and a controller, wherein
the storage includes:
a filter storage structured to store a two-dimensional digital filter that is a filter with no orientation or an even filter with orientation and is a filter that allows a band of a relatively high frequency to pass, or is a wavelet frame with orientation selectivity or a filter bank with orientation selectivity that are a set of an approximation filter with no orientation and a plurality of detail filters with respective orientations; and
an image data storage structured to store image data, and the controller executes generation of an edge-induced visual illusion image by:
applying the two-dimensional digital filter to the image data to extract a component of a relatively high frequency band, and/or by applying the two-dimensional digital filter to the image data and extracting a component of a relatively high frequency band to apply coloring to an edge of the extracted band component, generating an edge having a smooth positive value and an adjoining edge having a smooth negative value at a boundary between a bright area and a dark area in the image data, setting a portion with no brightness change in the image data to zero in a processed image, and scaling the processed image such that a value zero becomes a brightness of a ground and a height of the edge having a smooth positive value and the edge having a smooth negative value becomes suitable for an optical illusion effect.

11. A non-transitory computer-readable recording medium storing an edge-induced visual illusion generation program to be executed by a computer including at least a storage and a controller, wherein
the storage includes:
a filter storage structured to store a two-dimensional digital filter that is a filter with no orientation or an even filter with orientation and is a filter that allows a band of a relatively high frequency to pass, or is a wavelet frame with orientation selectivity or a filter bank with orientation selectivity that are a set of an approximation filter with no orientation and a plurality of detail filters with respective orientations; and
an image data storage structured to store image data, and the controller is caused to execute generation of an edge-induced visual illusion image by:
applying the two-dimensional digital filter to the image data to extract a component of a relatively high frequency band, and/or by applying the two-dimensional digital filter to the image data and extracting a component of a relatively high frequency band to apply coloring to an edge of the extracted band component generating an edge having a smooth positive value and an adjoining edge having a smooth negative value at a boundary between a bright area and a dark area in the image data, setting a portion with no brightness change in the image data to zero in a processed image, and scaling the processed image such that a value zero becomes a brightness of a ground and a height of the edge having a smooth positive value and the edge having a smooth negative value becomes suitable for an optical illusion effect.

* * * * *